US012656552B2

(12) United States Patent
Ito

(10) Patent No.: US 12,656,552 B2
(45) Date of Patent: Jun. 16, 2026

(54) DIFFUSING MEMBER, ILLUMINATING DEVICE, IMAGE READING APPARATUS, AND IMAGE FORMING APPARATUS TO IMPROVE DIFFUSIVITY OF LIGHT WITH SUPPRESSING A DECREASE OF INCIDENT LIGHT ON AN ILLUMINATED REGION OF AN ORIGINAL

(71) Applicant: CANON KABUSHIKI KAISHA, Tokyo (JP)

(72) Inventor: Narumasa Ito, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 343 days.

(21) Appl. No.: 18/466,054

(22) Filed: Sep. 13, 2023

(65) Prior Publication Data

US 2024/0103222 A1 Mar. 28, 2024

(30) Foreign Application Priority Data

Sep. 20, 2022 (JP) ................................. 2022-148815

(51) Int. Cl.
   *H04N 1/028* (2006.01)
   *G02B 6/26* (2006.01)
   *G02B 6/24* (2006.01)
(52) U.S. Cl.
   CPC ......... *G02B 6/262* (2013.01); *H04N 1/02855* (2013.01); *H04N 1/0289* (2013.01)
(58) Field of Classification Search
   CPC .. G02B 6/0001; G02B 6/262; H04N 1/02855; H04N 1/0289

(Continued)

(56) References Cited

U.S. PATENT DOCUMENTS

| | | | |
|---|---|---|---|
| 9,277,082 B2 | 3/2016 | Ito | |
| 2015/0207954 A1* | 7/2015 | Sugiyama | ............ H04N 1/1017 |
| | | | 358/475 |
| 2017/0272598 A1* | 9/2017 | Suga | .................. H04N 1/02855 |

FOREIGN PATENT DOCUMENTS

JP      2015-065634 A     4/2015

* cited by examiner

*Primary Examiner* — Chad Dickerson
(74) *Attorney, Agent, or Firm* — Carter, DeLuca & Farrell LLP

(57) ABSTRACT

The diffusing member includes a diffusing surface with protruding portions arrayed in a first direction. The protruding portions include a first group of protruding portions in which tops thereof are arranged on a first line parallel to the first direction when they are projected on a first cross section parallel to the first direction. Frequencies of inclination angles of the first group of protruding portions $\alpha$ within a range of $0°\pm5°$, $\beta$ within a range of $$\left[\sin^{-1}\left(\frac{1}{n}\right) + \frac{1}{2}\sin^{-1}\left(\frac{\sin\omega}{n}\right)\right] \pm 5° \text{ and}$$

$$-\left[\sin^{-1}\left(\frac{1}{n}\right) + \frac{1}{2}\sin^{-1}\left(\frac{\sin\omega}{n}\right)\right] \pm 5°,$$

and $\gamma$ within a range of $$\left[\sin^{-1}\left(\frac{1}{n}\right) + \frac{1}{2}\sin^{-1}\left(\frac{\sin\omega}{n}\right)\right] \pm 5° \text{ and}$$

$$-\left[\sin^{-1}\left(\frac{1}{n}\right) + \frac{1}{2}\sin^{-1}\left(\frac{\sin\omega}{n}\right)\right] \pm 5°,$$

at respective positions on a predetermined line parallel to the first direction of the first group when the first group is (Continued)

projected on a second cross section including each top thereof and perpendicular to the first cross section, a radiation angle of light incident on the diffusing surface $\omega$, and a refractive index of the diffusing member n, are appropriately set.

18 Claims, 22 Drawing Sheets

(58) Field of Classification Search
    USPC ........................................................ 358/484
    See application file for complete search history.

MAIN SCANNING [Y DIRECTION(mm)]

MAIN SCANNING [Y DIRECTION(mm)]

INCLINATION ANGLE (°)

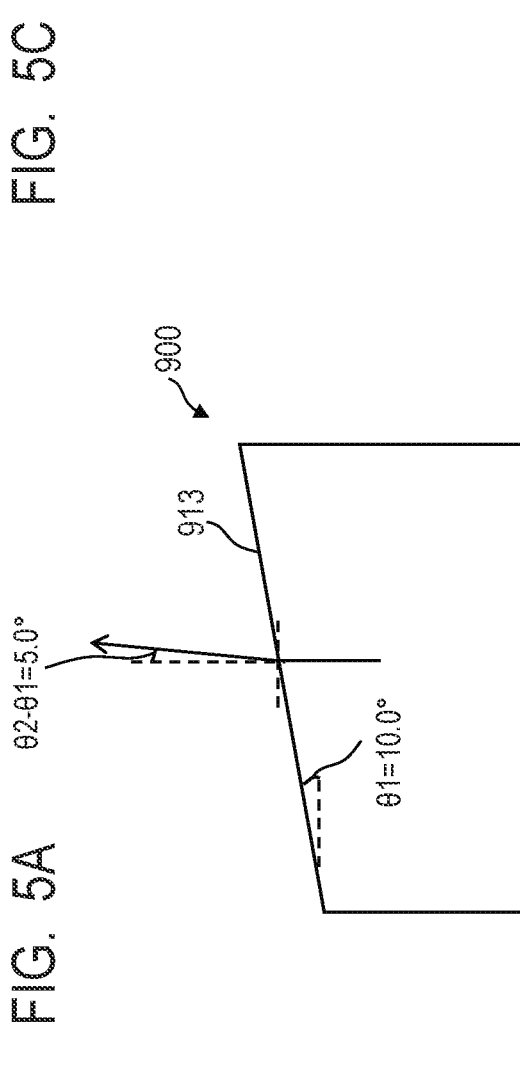
FIG. 5C
FIG. 5A
FIG. 5B
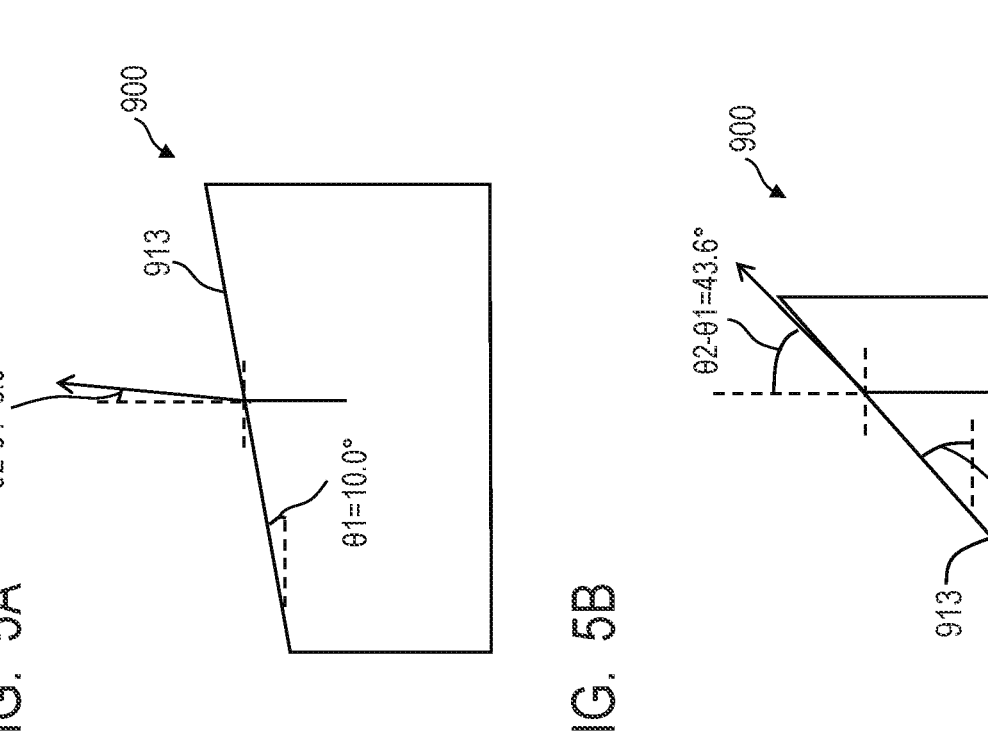
FIG. 5D

SUB-SCANNING [Z DIRECTION(mm)]

SUB-SCANNING [Z DIRECTION(mm)]

MAIN SCANNING [Y DIRECTION(mm)]

LUMINANCE

THIRD EMBODIMENT

- - - - COMPARATIVE EXAMPLE

-14 -12 -10 -8 -6 -4 -2 0 2 4 6 8 10 12 14 16 18

MAIN SCANNING [Y DIRECTION(mm)]

MAIN SCANNING [Y DIRECTION(mm)]

MAIN SCANNING [Y DIRECTION(mm)]

DIFFUSING MEMBER, ILLUMINATING DEVICE, IMAGE READING APPARATUS, AND IMAGE FORMING APPARATUS TO IMPROVE DIFFUSIVITY OF LIGHT WITH SUPPRESSING A DECREASE OF INCIDENT LIGHT ON AN ILLUMINATED REGION OF AN ORIGINAL

BACKGROUND OF THE INVENTION

Field of the Invention

The present invention is related to a diffusing member, and particularly, to a diffusing member suitable for an image reading unit provided in an image scanner, a copying machine, a facsimile or the like.

Description of the Related Art

Conventionally, when an image of an original is read in an image reading apparatus, an illuminating device is used in which a light guiding body guides light emitted from each of a plurality of light sources arrayed so as to be spaced away from each other in a main scanning direction to linearly illuminate an illuminated region of the original.

It is known that when such illuminating device is used in the image reading apparatus, illuminance unevenness corresponding to an interval between the arrayed light sources is generated in the illuminated region of the original to generate density unevenness accompanying the illuminance unevenness in the read image.

Japanese Patent Application Laid-Open No. 2015-65634 discloses an illuminating device in which a fine structure is formed on an exit surface of a light guiding body to diffuse light exiting from the light guiding body, thereby reducing the illuminance unevenness in the illuminated region of the original.

On the other hand, when a double-page spread thick original such as a book is mounted on an original table glass in order to read an image of the double-page spread thick original in the image reading apparatus, a central portion of the double-page spread thick original may be curved to lift in a sub-scanning direction perpendicular to a main scanning direction.

In addition, in a case where the original has a glossiness, light specularly reflected at the curved portion is guided to the reading unit, so that a plurality of light source images (mirror images) corresponding to a plurality of light sources spaced away from each other may appear as light and dark stripes in the read image.

In such case, it is conceivable to suppress the formation of the light and dark stripes by changing the fine structure formed on the exit surface of the light guiding body in the illuminating device disclosed in Japanese Patent Application Laid-Open No. 2015-65634 to increase a diffusivity of light exiting from the light guiding body.

However, when the fine structure formed on the exit surface of the light guiding body is changed such that the diffusivity of the light exiting from the light guiding body is increased, a light amount of light totally reflected by the fine structure may be increased to reduce a light amount of light incident on the illuminated region of the original by the illuminating device.

SUMMARY OF THE INVENTION

An object of the present invention is to provide a diffusing member capable of improving a diffusivity of light with suppressing a decrease in a light amount of the light incident on an illuminated region of an original.

The diffusing member according to the present invention includes a diffusing surface with a plurality of protruding portions arrayed in a first direction. The plurality of protruding portions includes a first group of protruding portions, in which tops of the first group of protruding portions are arranged on a first line parallel to the first direction when the first group of protruding portions are projected on a first cross section parallel to the first direction. The diffusing member according to the present invention satisfies the following conditions are satisfied:

$$1.5 \leq \beta/\alpha \leq 35$$

$$0 \leq \gamma/\beta \leq 0.5$$

where $\alpha$, $\beta$ and $\gamma$ represent frequencies of inclination angles of the first group of protruding portions within a range of $0° \pm 5°$, a range of sin $$\left[\sin^{-1}\left(\frac{1}{n}\right) + \frac{1}{2}\sin^{-1}\left(\frac{\sin\omega}{n}\right)\right] \pm 5° \text{ and}$$

$$-\left[\sin^{-1}\left(\frac{1}{n}\right) + \frac{1}{2}\sin^{-1}\left(\frac{\sin\omega}{n}\right)\right] \pm 5°,$$

and a range of $$\left[\sin^{-1}\left(\frac{1}{n}\right) + \frac{1}{2}\sin^{-1}\left(\frac{\sin\omega}{n}\right)\right] \pm 5° \text{ and}$$

$$-\left[\sin^{-1}\left(\frac{1}{n}\right) + \frac{1}{2}\sin^{-1}\left(\frac{\sin\omega}{n}\right)\right] \pm 5°,$$

respectively, at respective positions on a predetermined line parallel to the first direction of the first group of protruding portions when the first group of protruding portions are projected on a second cross section including each top of the first group of protruding portions and perpendicular to the first cross section, $\omega$ represents a radiation angle of the light incident on the diffusing surface, and n represents a refractive index of the diffusing member.

Further features of the present invention will become apparent from the following description of exemplary embodiments with reference to the attached drawings.

BRIEF DESCRIPTION OF THE DRAWINGS

FIG. 5A is a view showing a relationship between an inclination angle of an exit surface and an exit angle of a light beam from the exit surface in a predetermined diffusing member.

FIG. 5B is a view showing a relationship between an inclination angle of an exit surface and an exit angle of a light beam from the exit surface in a predetermined diffusing member.

FIG. 5C is a view showing a relationship between an inclination angle of an exit surface and an exit angle of a light beam from the exit surface in a predetermined diffusing member.

FIG. 5D is a view showing a relationship between an inclination angle of an exit surface and an exit angle of a light beam from the exit surface in a predetermined diffusing member.

DESCRIPTION OF THE EMBODIMENTS

Figure 1:
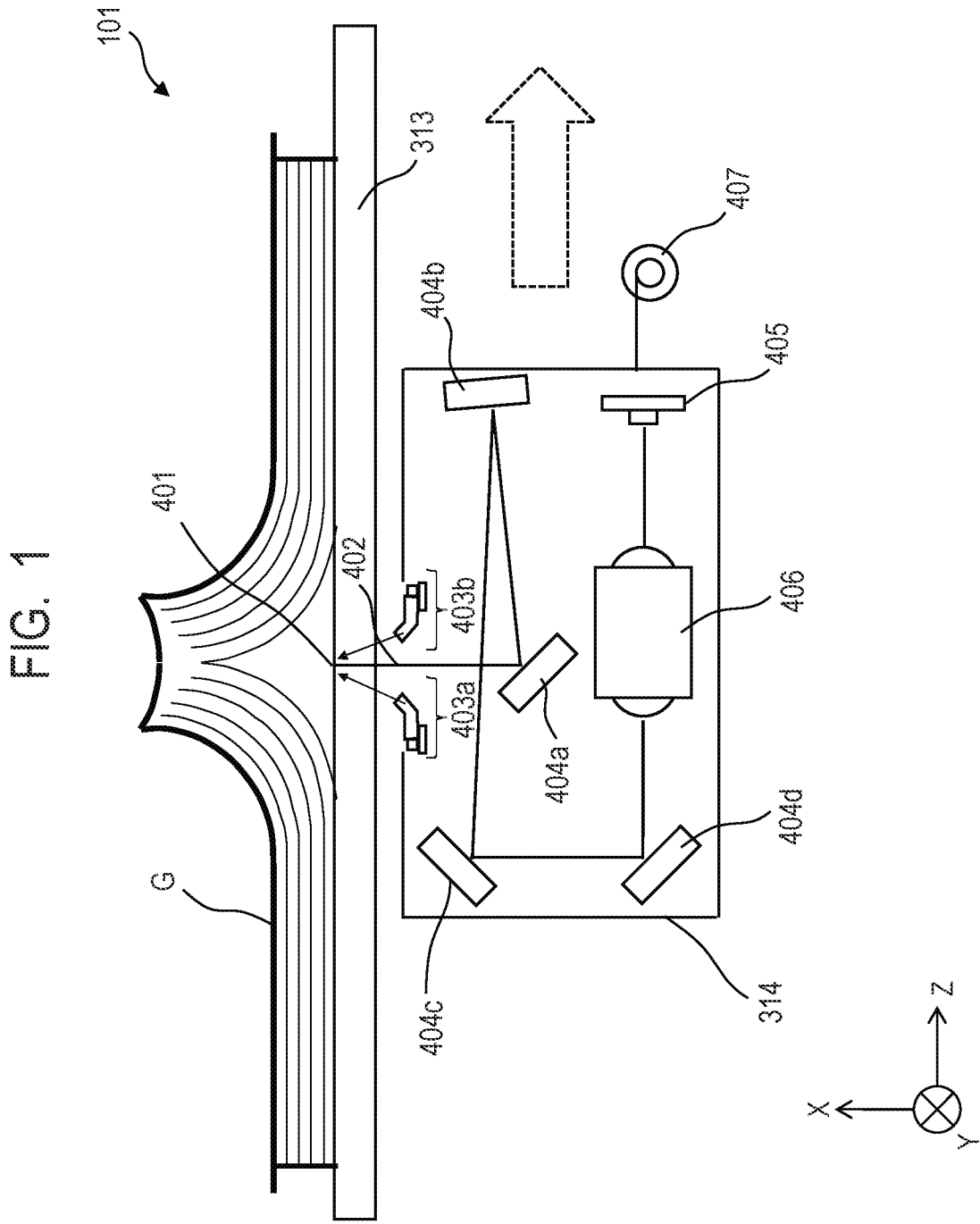
FIG. 1 is an enlarged cross-sectional view of an image reading apparatus with an illuminating device including a light guiding body according to a first embodiment of the present invention.

Hereinafter, a diffusing member according to the present invention is described in detail with reference to the accompanying drawings. Note that the drawings described below may be drawn on a scale different from the actual scale in order to facilitate understanding of the present invention.

Further, a direction in which an image reading unit extends is defined as a Y direction (a first direction), and a direction in which the image reading unit moves for scanning or an original is conveyed toward the image reading unit is defined as a Z direction (a second direction). Then, a direction perpendicular to the Z direction and the Y direction is defined as an X direction.

The Y direction and the Z direction may be referred to as a main scanning direction and a sub-scanning direction, respectively.

In the drawings, the same members are denoted by the same reference numerals, and redundant description is omitted.

First Embodiment

In the image reading apparatus for reading an image of an original in a line sequential manner, an illuminated region of the original is linearly illuminated by an illuminating device, and light reflected from a read region is guided to a reading means such as a line sensor at a predetermined magnification by an imaging optical system.

In recent years, a light emitting diode (hereinafter, referred to as an LED) is used as a light source of such illuminating device.

That is, an LED array in which a plurality of LEDs are arrayed in the main scanning direction is used as the light source in the illuminating device that linearly illuminates the illuminated region of the original in the main scanning direction.

Further, a structure is used in which light from each of the plurality of LEDs is efficiently guided to the illuminated region of the original by using a light guiding body formed of a light transmitting member in the illuminating device.

At this time, it is known that illuminance unevenness corresponding to an interval between the plurality of LEDs arrayed occurs in the illuminated region of the original in such illuminating device, so that density unevenness due to the illuminance unevenness occurs in an image read by an image reading apparatus including the illuminating device.

Accordingly, in the related art, an illuminating device is known in which a fine structure is formed on an exit surface of the light guiding body to diffuse light exiting from the light guiding body, thereby reducing the illuminance unevenness in the illuminated region of the original and thus the density unevenness in the image read by the image reading apparatus.

On the other hand, when a double-page spread thick original such as a book is mounted on an original table glass in order to read an image of the double-page spread thick original in the image reading apparatus, a central portion of the double-page spread thick original may be curved to lift in a sub-scanning direction perpendicular to a main scanning direction.

In addition, in a case where the original has a glossiness, light specularly reflected at the curved portion is guided to a reading unit, so that a plurality of light source images (mirror images) corresponding to the plurality of light sources spaced away from each other may appear as light and dark stripes in the read image.

In such case, if an attempt is made to suppress the formation of the light and dark stripes by increasing diffusivity of the light exiting from the light guiding body by adjusting the fine structure formed on the exit surface of the light guiding body in the conventional illuminating device, light totally reflected by the fine structure increases.

That is, since the light totally reflected by the fine structure increases, a light amount of the light illuminating the illuminated region of the original by the illuminating device may decrease.

Accordingly, an object of the present invention is to provide a diffusing member capable of improving the diffusivity of the light with suppressing a decrease in the light amount of the light incident on the illuminated region of the original, and an illuminating device including the diffusing member.

Further, another object of the present invention is to provide an image reading apparatus capable of suppressing a formation of light and dark stripes in a read image by using such illuminating device, and an image forming apparatus including the image reading apparatus.

FIG. 1 shows an enlarged cross-sectional view of the vicinity of a first image reading unit 314 of an image reading apparatus 101 provided with the first image reading unit 314 including illuminating devices 403a and 403b with a light guiding body 411 as a diffusing member according to a first embodiment of the present invention.

A specific structure of the image reading apparatus 101 is described later.

As shown in FIG. 1, an original surface of an original G mounted on the original table glass 313 is illuminated by the illuminating devices 403a and 403b provided in the first image reading unit 314 in the image reading apparatus 101.

Next, diffusely reflected light from the original surface of the original G is reflected by a first folding mirror 404a, a second folding mirror 404b, a third folding mirror 404c and a fourth folding mirror 404d.

Then, the diffusely reflected light is guided (condensed) onto a light receiving unit 405 (an image reading sensor, a first light receiving unit) by the imaging optical system 406 (a reduction optical system, a first optical system) to obtain image information of the illuminated portion of the original surface of the original G, namely a read region 401.

As shown in FIG. 1, the image reading apparatus 101 is provided with two illuminating devices 403a and 403b (first and second illuminating devices) which are arranged symmetrically with respect to a reading optical axis 402 and have the same structure.

Since the two illuminating devices 403a and 403b are provided in this manner, the read region 401 (a first reading position) of the original G can be illuminated from both sides with respect to an XY cross section including the reading optical axis 402.

The light receiving unit 405 is formed by an image sensor such as a charge coupled device (CCD) image sensor or a complementary metal oxide semiconductor (CMOS) image sensor.

Specifically, the light receiving unit 405 is formed by a line sensor in which pixels are arrayed in a line along the Y direction.

However, the present invention is not limited thereto, and the light receiving unit 405 may be a line sensor in which red (R) pixels, green (G) pixels, and blue (B) pixels are arrayed in a line in the Y direction.

Further, the light receiving unit 405 may be a two-dimensional sensor in which R pixels, G pixels, and B pixels each of which is arrayed in a line in the Y direction are arrayed in the X direction.

As shown in FIG. 1, a driving unit 407 drives the first image reading unit 314 to move the first image reading unit 314 for scanning in the Z direction, thereby the light receiving unit 405 can obtain image information of the entire original surface of the original G in a line sequential manner.

The image information thus obtained by the light receiving unit 405 is transmitted as an electric signal to an external apparatus (not shown) such as an image processing unit or a personal computer via an interface.

Next, a structure of the light guiding body 411 according to the present embodiment and an effect thereof are described.

Figure 2A:
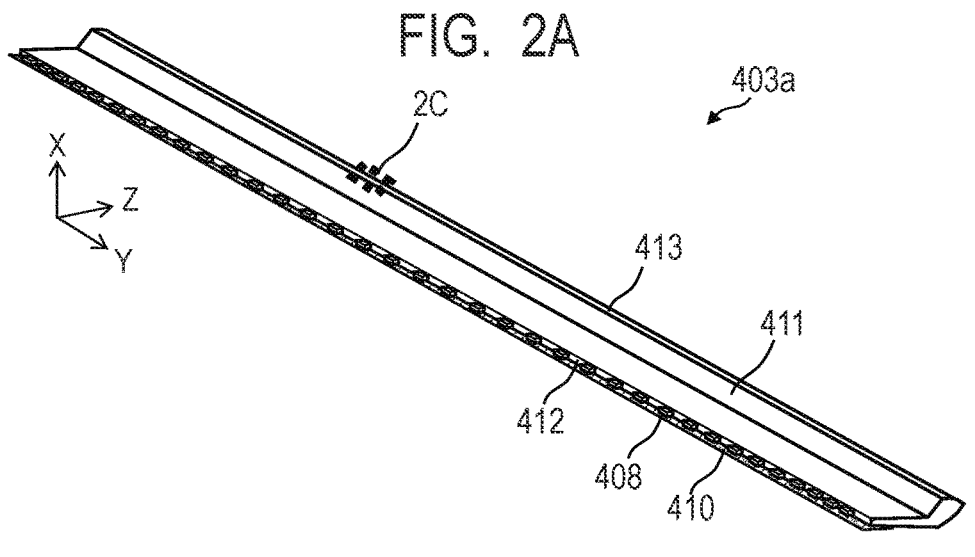
FIG. 2A is a perspective view of the illuminating device including the light guiding body according to the first embodiment.
Figure 2B:
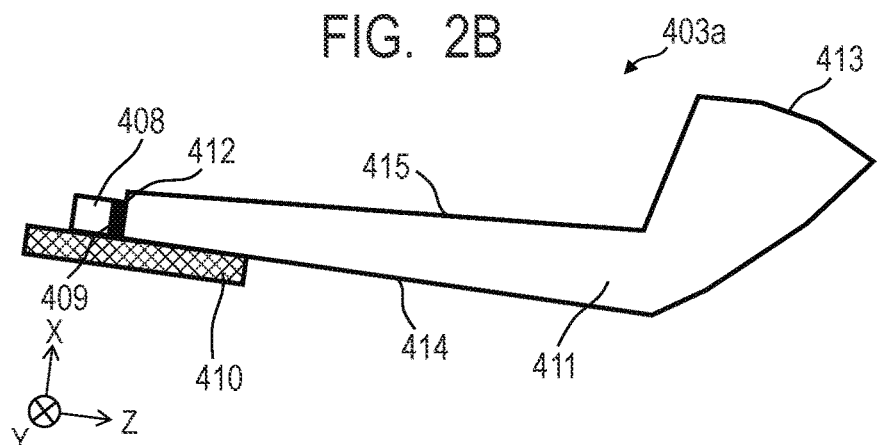
FIG. 2B is a cross-sectional view of the illuminating device including the light guiding body according to the first embodiment.

FIGS. 2A and 2B show a perspective view and an XZ cross-sectional view of the illuminating device 403a including the light guiding body 411 according to the present embodiment, respectively.

Figure 2C:
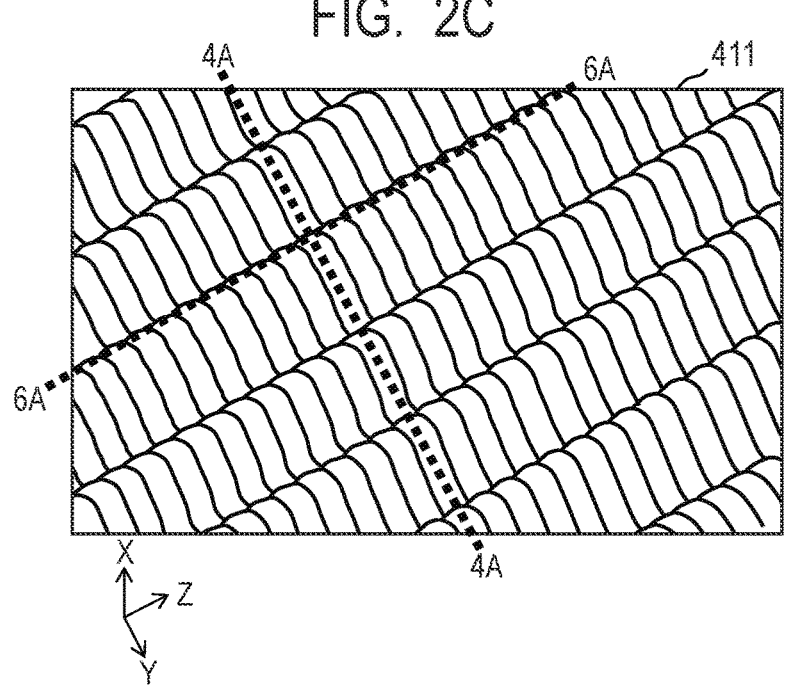
FIG. 2C is an enlarged perspective view of the illuminating device including the light guiding body according to the first embodiment.

FIG. 2C shows an enlarged perspective view of a 2C region of the light guiding body 411 according to the present embodiment shown in FIG. 2A.

Since the illuminating devices 403a and 403b have the same structure as described above, only the illuminating device 403a is described below.

As shown in FIGS. 2A and 2B, the illuminating device 403a includes light sources 408, a holding member 410, and the light guiding body 411 according to the present embodiment.

The light sources 408 are white LEDs, for example, and are arrayed in the Y direction at predetermined intervals.

The light source 408 is not limited to the LED, and an ED element or the like may be used. The light source 408 preferably emits white light, but may emit red light, green light, blue light or the like.

The holding member 410 is a light source substrate or an LED substrate which is long in the Y direction and is configured to hold the light sources 408, for example.

As a material of the holding member 410, aluminum, glass epoxy (a material formed by impregnating glass fibers with an epoxy resin and then performing a heat-curing process into a plate shape) or the like can be used.

The light guiding body 411 according to the present embodiment is long in the Y direction, and guides light emitted from a light emitting surface 409 of the light source 408, thereby the light is transmitted through the original table glass 313 and is irradiated on an irradiated surface, namely the original surface of the original G.

As a material of the light guiding body 411 according to the present embodiment, an inorganic material having translucency such as glass, or an organic material having translucency such as an acrylic resin, a polyester resin and a polycarbonate resin can be used.

In particular, it is preferred to use a synthetic resin material such as plastic for easily molding as the material of the light guiding body 411 according to the present embodiment, and an acrylic resin (PMMA) is employed in the light guiding body 411 according to the present embodiment.

Further, as shown in FIG. 2B, a side-view type light source configured such that the holding member 410 holds a held surface perpendicular to the light emitting surface 409 is used as the light source 408, but the present invention is not limited thereto, and a top-view type light source may be used.

Figure 3A:
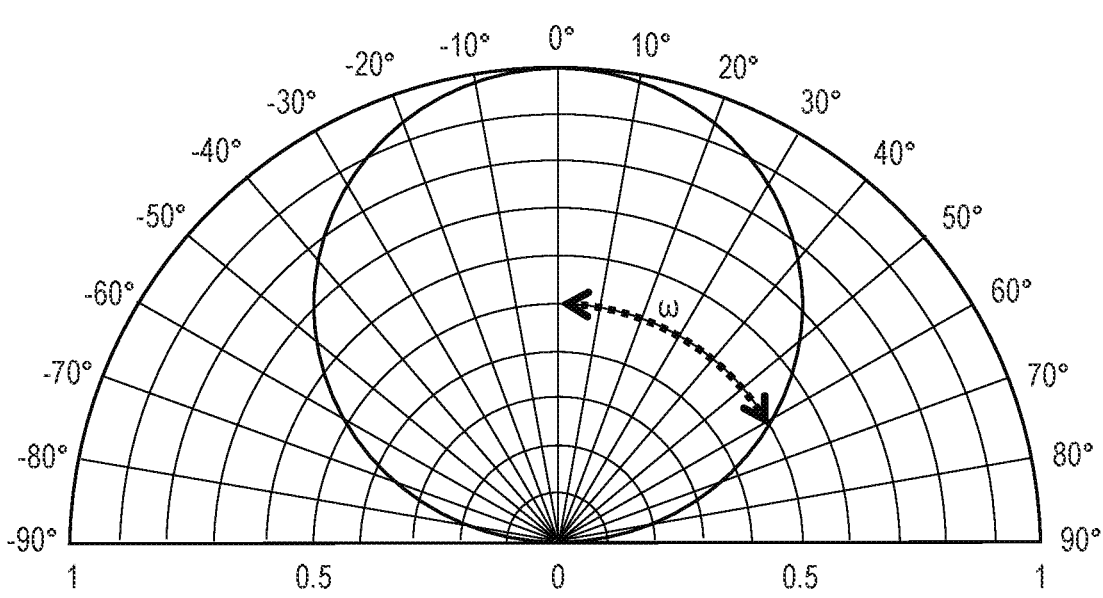
FIG. 3A is a diagram showing a light distribution characteristic of a light source provided in the illuminating device.
Figure 3B:
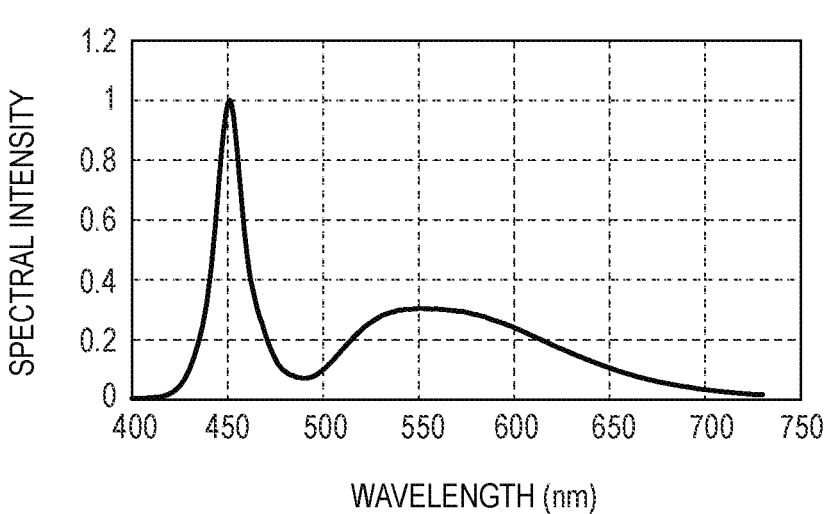
FIG. 3B is a diagram showing a light emission spectrum of the light source provided in the illumination apparatus.

FIGS. 3A and 3B show a light distribution characteristic and a light emission spectrum of the light source 408 provided in the illuminating device 403a, respectively.

Since the LED used for the light source 408 is excellent in terms of cost, the LED often has a structure in which a fluorescent body having a flat surface shape is exposed without using a resin lens or the like for condensing light.

Such LED has a light distribution characteristic called Lambertian light emission as shown in FIG. 3A.

Specifically, in FIG. 3A, 0° corresponds to the Z direction, namely a normal direction perpendicular to the light emitting surface 409 of the light source 408.

That is, the direction in which the strongest light is emitted from the light source 408 (a maximum intensity direction), in other words, the direction in which the luminance is high is the 0° direction.

Then, each of the light sources 408 emits the strongest light in the normal direction of the light emitting surface 409, and emits light over a wide range of ±90° from the normal direction.

At this time, when an intensity of the light emitted in the normal direction is 1, the light emitted in the range of ±60° in which the intensity is 0.5 or more is particularly important in the illumination by the illuminating devices 403a and 403b.

In other words, in the Lambertian light emission in the light source 408, the light emitted in the range of the half angle at half maximum ω=600 is particularly important in the illumination by the illuminating devices 403a and 403b. Hereinafter, the half angle at half maximum ω is referred to as a radiation angle ω of light from the light source 408.

FIG. 3B shows an example of a light emission spectrum of a general white LED used as the light source 408.

Specifically, the white LED is a blue LED chip for emitting a light beam having a wavelength of about 450 nm, and is configured to emit white light by exciting yellow or orange fluorescent bodies filled around the blue LED chip to fluoresce such that light therefrom are mixed.

As shown in FIG. 2B, the light guiding body 411 according to the present embodiment has an incident surface 412, an exit surface 413 (a diffusing surface), a first light guiding surface 414 and a second light guiding surface 415.

Light emitted from the light emitting surface 409 of the light source 408 is incident on the inside of the light guiding body 411 from the incident surface 412, and then is guided toward the exit surface 413 with repeating a total reflection by each of the first light guiding surface 414 and the second light guiding surface 415 facing each other in the X direction.

Then, when the light exits from the exit surface 413, a linear read region 401 extending in the Y direction on the original surface (an irradiated surface) of the original G is illuminated.

In the light guiding body 411 according to the embodiment, an interval between the first light guiding surface 414 and the second light guiding surface 415 is configured to be wider from the incident surface 412 toward the exit surface 413 in order to illuminate the read region 401 of the original G with stronger light by increasing a light collection efficiency.

Then, it is possible to guide light to the exit surface 413 with providing a light condensing function in the Z direction by bending an optical path in a light reflecting and condensing portion in the YZ cross section.

Here, a shape of the light guiding body 411 according to the present embodiment in the ZX cross section is not limited to the above-described shape as long as the light emitted from the light emitting surface 409 of the light source 408 can be guided to the read region 401 of the original G.

As shown in FIG. 2C, the exit surface 413 of the light guiding body 411 according to the present embodiment has a diffusing structure that causes light guided by the light guiding body 411 after being emitted from the light emitting surface 409 of the light source 408 to exit with a diffusion.

Here, a problem to be solved by the light guiding body 411 according to the present embodiment is described.

Figure 18A:
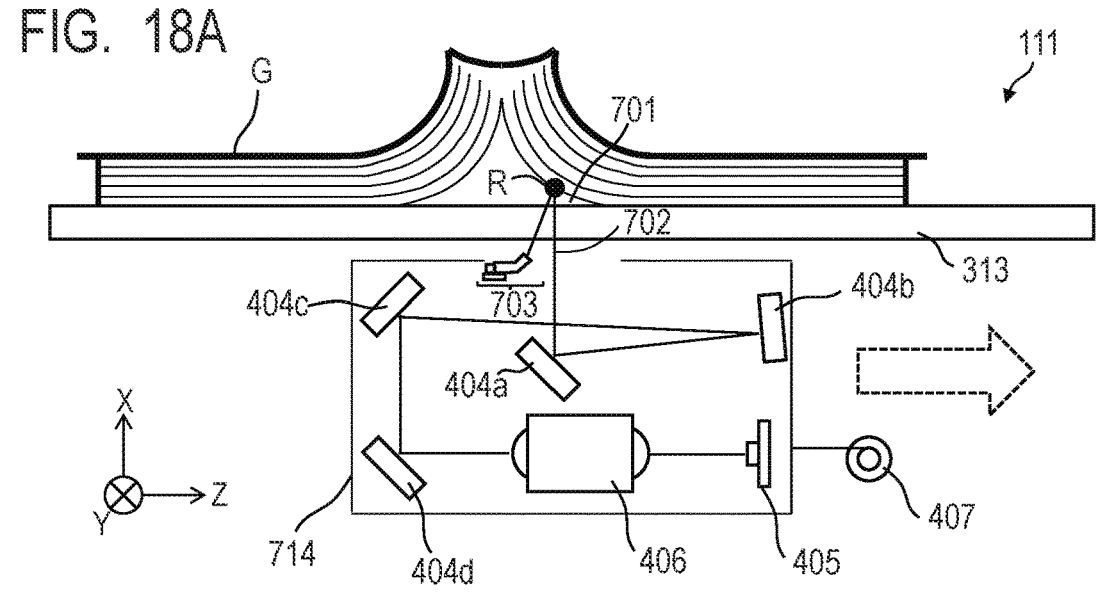
FIG. 18A is an enlarged cross-sectional view of an image reading apparatus with an illuminating device including a light guiding body according to a comparative example.

FIG. 18A shows an enlarged cross-sectional view of the vicinity of a first image reading unit 714 of an image reading apparatus 111 provided with the first image reading unit 714 with an illuminating device 703 including a light guiding body 711 according to a comparative example.

Since the light guiding body 711 according to the comparative example has the same structure as the light guiding body 411 according to the present embodiment except that an exit surface 713 is provided instead of the exit surface 413, the same structures are denoted by the same numerals, and the description thereof is omitted.

Further, since the illuminating device 703 has the same structure as the illuminating device 403a except that the light guiding body 711 according to the comparative example is provided instead of the light guiding body 411 according to the present embodiment, the same members are denoted by the same numerals, and the description thereof is omitted.

Furthermore, since the first image reading unit 714 has the same structure as the first image reading unit 314 except that the illuminating device 703 is provided instead of the illuminating device 403a, the same members are denoted by the same numerals, and the description thereof is omitted.

In addition, since the image reading apparatus 111 has the same structure as the image reading apparatus 101 except that the first image reading unit 714 is provided instead of the first image reading unit 314, the same members are denoted by the same numerals and the description thereof is omitted.

In the first image reading unit 714, one illuminating device 703 is provided so as to illuminate a read region 701 of the original G from one side with respect to the XY cross section including a reading optical axis 702.

In an illuminating device used in a general image reading apparatus, when a plurality of LEDs as light sources are arrayed in a main scanning direction (Y direction), each LED can be regarded as a point light source.

Further, as shown in FIG. 18A, when the image reading apparatus 111 reads an image of a double-page spread thick original G such as a book, a central portion of the original G is likely to be curled (curved) to lift in the sub-scanning cross section (ZX cross section).

Figure 18B:
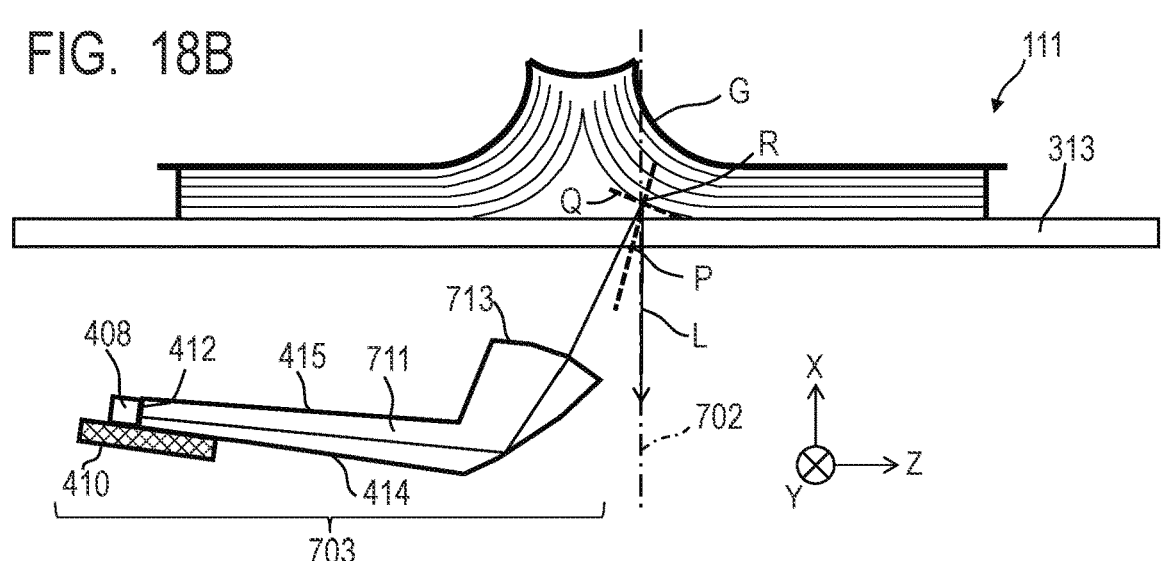
FIG. 18B is an enlarged cross-sectional view of the image reading apparatus with the illuminating device including the light guiding body according to the comparative example.
Figure 18C:
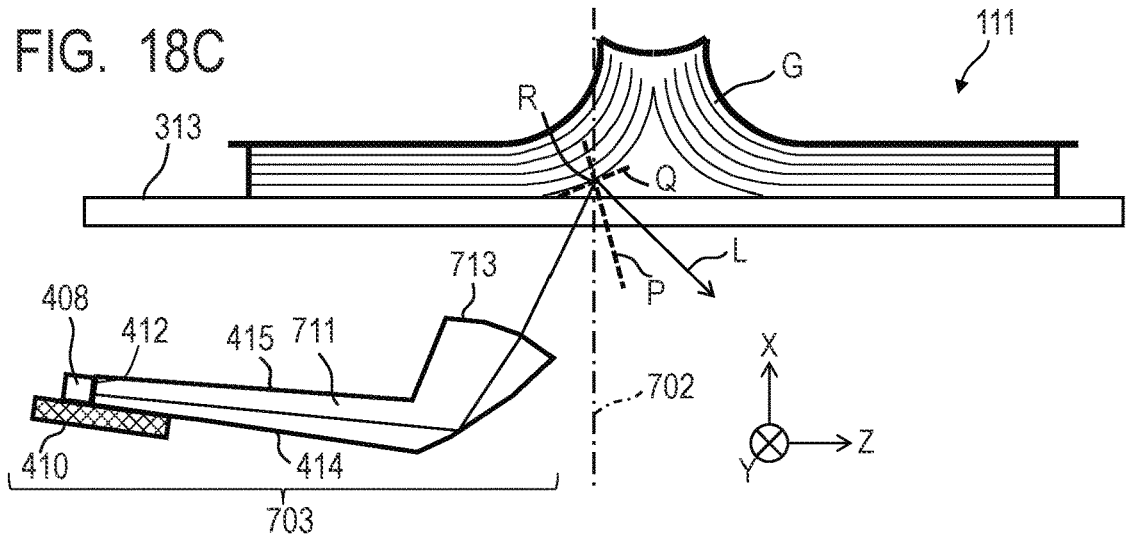
FIG. 18C is an enlarged cross-sectional view of the image reading apparatus with the illuminating device including the light guiding body according to the comparative example.

FIGS. 18B and 18C show enlarged cross-sectional views of the image reading apparatus 111 showing the illuminating device 703 in an enlarged manner, and show how light emitted from the illuminating device 703 is reflected by the original G.

For example, in a case where the original G has glossiness, namely is a glossy original, the original G is illuminated by the illuminating device 703 to generate specularly reflected light L.

At this time, as shown in FIG. 18B, depending on a posture of the curved portion of the original G at a reading position R with respect to the original table glass 313, namely a tangential line Q (a normal line P) of the original G at the reading position R, an emitting direction of the specularly reflected light L coincides with the reading optical axis 702.

Then, the specularly reflected light L thus emitted is reflected by the folding mirrors 404a to 404d and then condensed on the light receiving unit 405 by the imaging optical system 406.

Thereby, bright light source images (mirror images) LS corresponding to the plurality of light sources 408 which are particularly bright portions and are spaced away from each other is formed, so that the formed light source images LS appear as light and dark stripes in the read image.

Figure 19A:
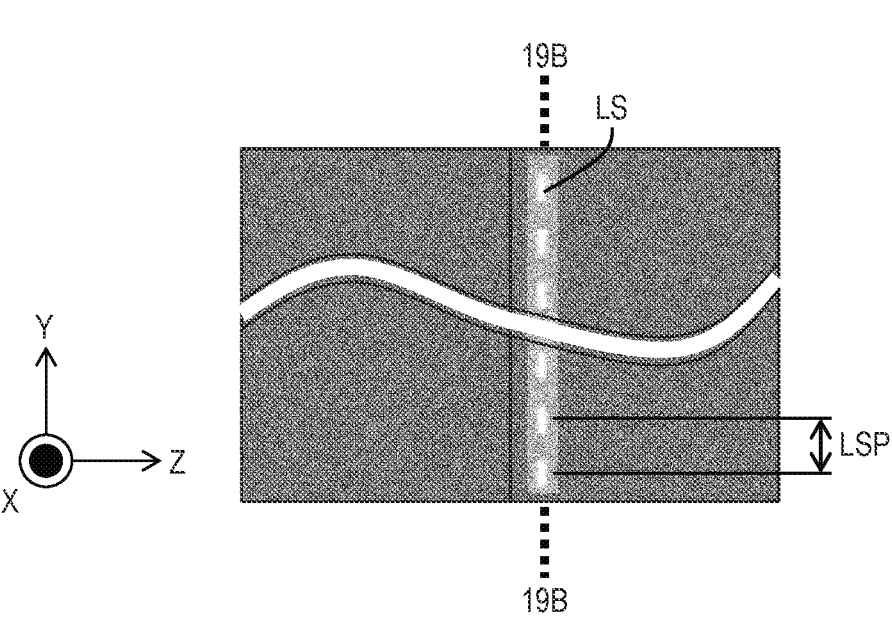
FIG. 19A is a view illustrating an image read by the image reading apparatus including the light guiding body according to the comparative example.

FIG. 19A schematically shows an image read by the first image reading unit 714 in the image reading apparatus 111.

Figure 19B:
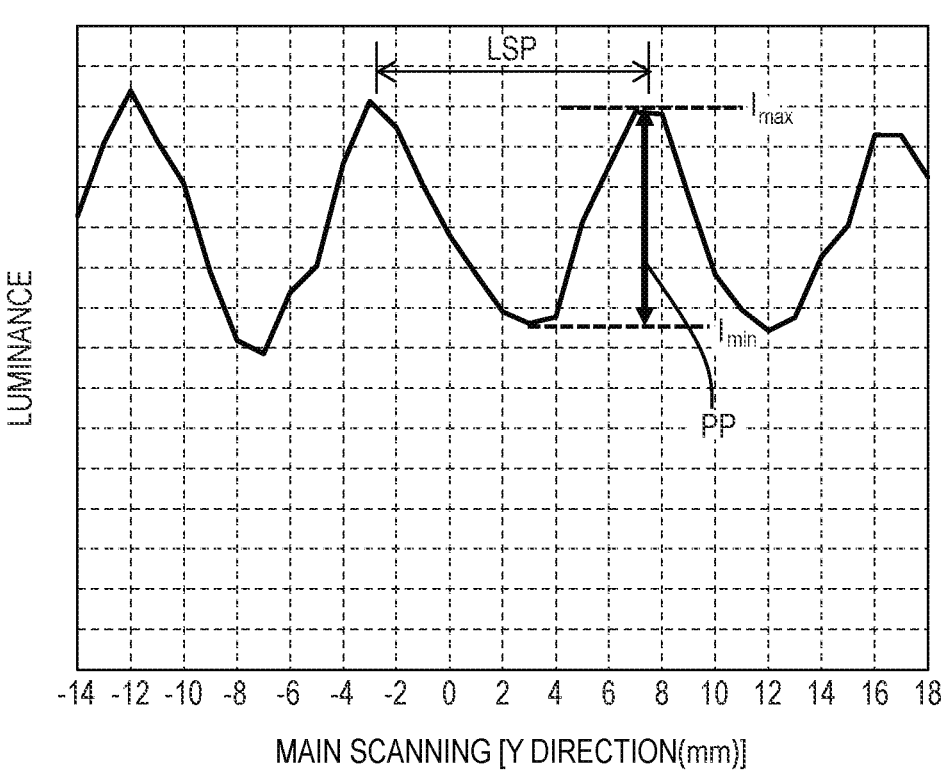
FIG. 19B is a graph showing a positional dependence in the main scanning direction of luminance in the image read by the image reading apparatus with the light guiding body according to the comparative example.

FIG. 19B shows a positional dependence in the Y direction of luminance along a line 19B shown in FIG. 19A in the read image.

As shown in FIG. 19A, light and dark stripes corresponding to a plurality of light source images LS spaced away from each other at the light source pitch LSP generated by the specularly reflected light L appear in the image read by the image reading apparatus 111 as described above.

Then, as shown in FIG. 19B, a plurality of peak structures in the luminance so as to correspond to respective light source images LS clearly appear on the line 19B.

Here, when an interval between the peak structures is represented by LSP, the LSP corresponds to an interval between the light source images LS, namely an interval between the light sources 408.

The exit surface 713 of the light guiding body 711 according to the comparative example is subjected to texturing, so that a diffusion angle in the main scanning direction of light exiting from the light guiding body 711 according to the comparative example is about 20°.

Here, the diffusion angle refers to a width (a full angle at half maximum) between angles at which an intensity of diffused light exiting from a diffusing member is half of the maximum value when linear light such as laser light is vertically incident on the diffusing member.

That is, even if the exit surface 713 of the light guiding body 711 according to the comparative example is subjected to known texturing, the diffusion in the main scanning direction of the light exiting from the light guiding body 711 according to the comparative example is not sufficient.

In other words, as shown in FIG. 19B, when a difference between the maximum value $I_{max}$ and the minimum value $I_{min}$ of the luminance in each peak structure is defined as a luminance difference PP, the light and dark stripes remarkably appear in the read image since the luminance difference PP is large.

On the other hand, as shown in FIG. 18C, when the posture of the curved portion of the original G at the reading position R with respect to the original table glass 313 is opposite to the posture shown in FIG. 18B, the emitting direction of the specularly reflected light L does not coincide with the reading optical axis 702.

In this case, light and dark stripes corresponding to the plurality of light source images LS do not appear in the read image.

In the light guiding body 411 according to the present embodiment, it is possible to suppress such problem in the light guiding body 711 according to the comparative example, namely the formation of the light and dark stripes in the read image by employing the structure described below.

Specifically, the exit surface 413 of the light guiding body 411 according to the present embodiment has the diffusing structure as shown in FIG. 2C, so that it is possible to improve diffusivity of light exiting from the light guiding body 411 according to the present embodiment as described below.

Figure 4A:
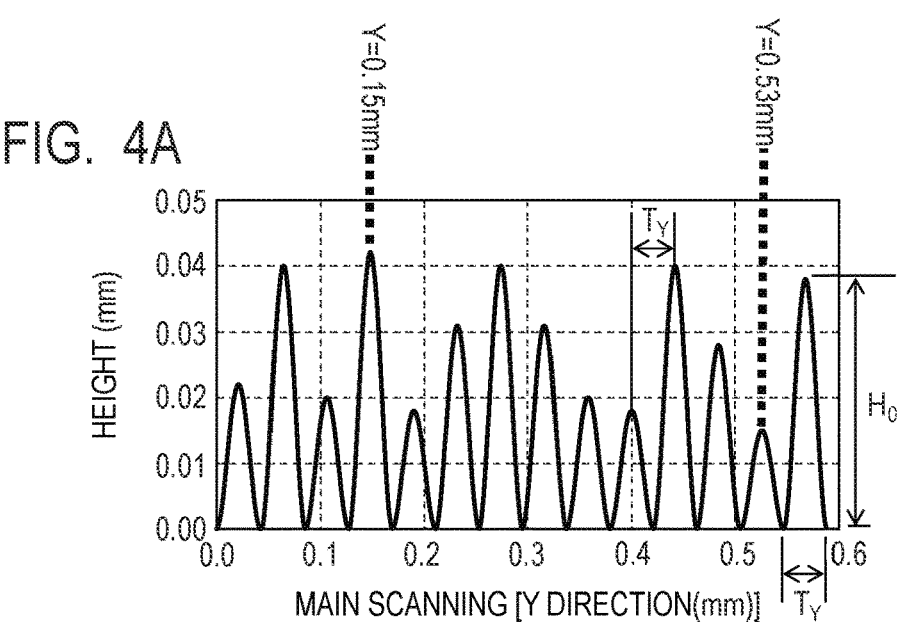
FIG. 4A is a graph showing a positional dependence in a main scanning direction of a height in a diffusing structure formed in the light guiding body according to the first embodiment.

FIG. 4A shows a positional dependence in the Y direction of a height H in the X direction in a cross section 4A parallel to the XY cross section (a second cross section) shown in FIG. 2C of the diffusing structure formed on the exit surface 413 of the light guiding body 411 according to the present embodiment.

Here, the cross section 4A shown in the FIG. 2C is a cross section including respective tops of a plurality of protruding portions included in a first protruding portion group arranged on a predetermined line (a first line) parallel to the Y direction.

Further, the predetermined line is a line on which the tops of the plurality of protruding portions included in the first protruding portion group are arranged when they are projected into the YZ cross section (a first cross section).

The horizontal axis in FIG. 4A corresponds to each position on a line parallel to the Y direction included in the cross section 4A.

As shown in FIG. 4A, the diffusing structure formed on the exit surface 413 of the light guiding body 411 according to the present embodiment is formed by a peak structure (a concave-convex structure) having fourteen kinds of protruding portions. The fourteen kinds of protruding portions are periodically arrayed with being continuously connected to each other in the Y direction.

Widths $T_Y$ and intervals $T_Y$ in the Y direction of the respective protruding portions are set to 0.042 mm which are the same as each other. That is, the width $T_Y$ in the XY cross section of each protruding portion and the interval $T_Y$ between the protruding portions adjacent to each other in the Y direction are set to be the same as each other.

Further, the maximum value $H_0$ (a maximum height) of the height of each protruding portion is set between 0.015 mm and 0.042 mm.

Here, when a value of a ratio of the maximum value $H_0$ of the height to the width $T_Y$ of the protruding portion is defined as an aspect ratio, the aspect ratio of each protruding portion in the diffusing structure formed on the exit surface 413 of the light guiding body 411 according to the present embodiment is set between 0.4 and 1.0.

In other words, it is preferred that a condition of $H_0/T_Y \leq 1.0$ is satisfied in any protruding portion with respect to the width $T_Y$ and the maximum value $H_0$ of the height in the XY cross section of the protruding portion in the light guiding body 411 according to the present embodiment.

When the aspect ratio is more than 1.0, a transferability when the diffusing structure is formed on the exit surface 413 of the light guiding body 411 according to the present embodiment may become insufficient, which is not preferable.

Further, when a magnitude of the width $T_Y$ of each protruding portion and a magnitude of a wavelength of light exiting from the exit surface 413 are approximately the same as each other, an influence of a diffraction in wave optics occurs, so that a difference occurs between a result in the wave optics and a result in geometrical optics in which light is treated as a light beam.

On the other hand, when the magnitude of the width $T_Y$ of each protruding portion is set to be ten times or more the wavelength of the light, the result in the wave optics and the result in the geometrical optics are approximately the same as each other.

Accordingly, in the light guiding body 411 according to the present embodiment, it is preferred that a condition of $T_Y/\lambda \geq 10$ is satisfied when the width in the XY cross section of each protruding portion and the wavelength of the light exiting from the exit surface 413 are represented by $T_Y$ and $\lambda$.

In the light guiding body 411 according to the present embodiment, the width $T_Y$ of each protruding portion is set to be about fifty times the wavelength $\lambda$ of the light exiting from the exit surface 413.

Further, each protruding portion in the diffusing structure formed on the exit surface 413 of the light guiding body 411 according to the present embodiment has a rotationally symmetric shape so as to be easily processed by using a mold, and can be expressed by a polynomial function (a mathematical expression).

Specifically, each protruding portion in the diffusing structure formed on the exit surface 413 of the light guiding body 411 according to the present embodiment is set by using a sixth-order polynomial function with respect to a position in the Y direction as expressed by the following expression (1):

$$H = H_0[1 - (5.08 \times 10^3)Y^2 + (7.70 \times 10^6)Y^4 - (3.00 \times 10^9)Y^6] \qquad (1).$$

Figure 4B:
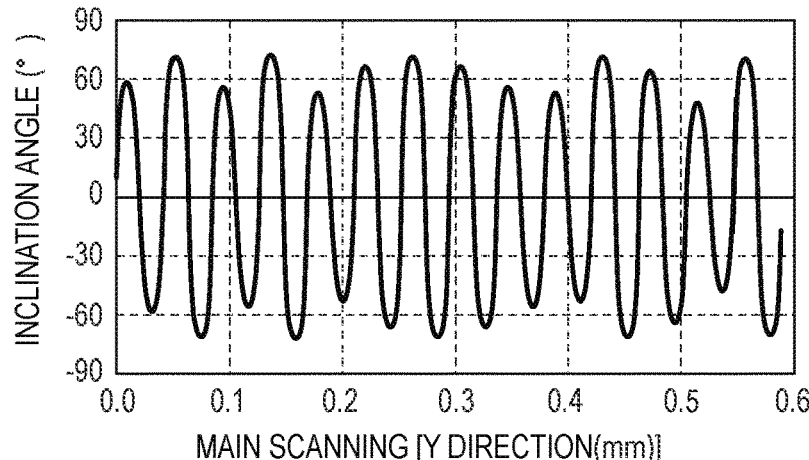
FIG. 4B is a graph showing a positional dependence in the main scanning direction of an inclination angle in the diffusing structure formed in the light guiding body according to the first embodiment.

FIG. 4B shows a positional dependence in the Y direction of an inclination angle in the cross section 4A of the diffusing structure formed on the exit surface 413 of the light guiding body 411 according to the present embodiment.

Note that the positional dependence in the Y direction of the inclination angle can be obtained by first-order differentiation of the polynomial function expressing each protruding portion described above with respect to the variable Y.

Further, the positional dependence in the Y direction of the inclination angle is not limited thereto, and may be obtained from, for example, a height difference $\Delta H$ between two points adjacent to each other at an interval of $\Delta Y = 0.001$ mm in the positional dependence in the Y direction of the height H shown in FIG. 4A. That is, in this case, the inclination angle can be obtained from $\tan^{-1}(\Delta H/\Delta Y)$.

Figure 4C:
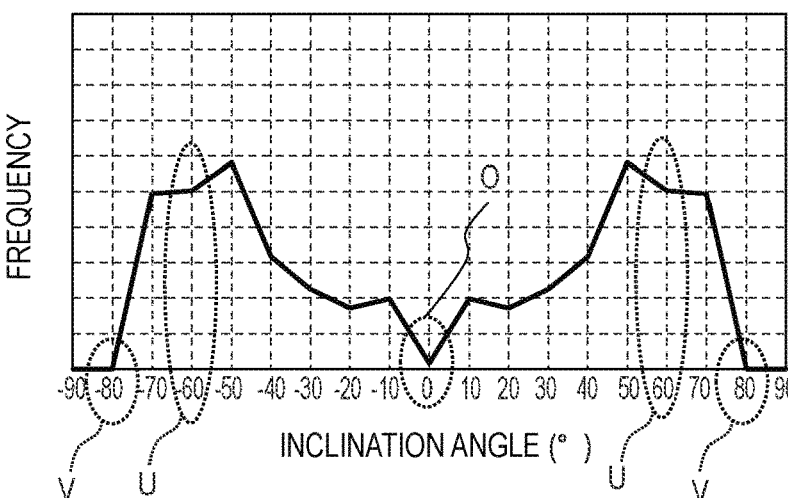
FIG. 4C is a graph showing a frequency of the inclination angle in the diffusing structure formed in the light guiding body according to the first embodiment.

FIG. 4C shows a frequency of the inclination angle. The frequency referred to herein corresponds to the number of the inclination angles when values of the inclination angles are obtained at predetermined intervals in the Y direction in the cross section 4A of the diffusing structure formed on the exit surface 413 of the light guiding body 411 according to the present embodiment.

Here, a range of the inclination angles of $0° \pm 5°$ is defined as a range O, a range of the inclination angles of $60° \pm 5°$ and $-60° \pm 5°$ is defined as a range U, and a range of the inclination angles of $78° \pm 5°$ and $-78° \pm 5°$ is defined as a range V. Details of the range U and the range V are described later.

At this time, in the diffusing structure formed on the exit surface 413 of the light guiding body 411 according to the present embodiment, the frequency of the inclination angles in the range U is larger than the frequency of the inclination angles in the range O as shown in FIG. 4C.

FIGS. 5A, 5B and 5C schematically show a relationship between an inclination angle of an exit surface 913 and an exiting angle of a light beam exiting from the exit surface 913 in a predetermined diffusing member 900.

Specifically, when a refractive index of the diffusing member 900 at the d-line (the wavelength of 587.6 nm), for example, is represented by n, an incident angle of the light beam with respect to a normal to the exit surface 913 is represented by $\theta_1$, the refractive index of an air layer is set to 1, and the exiting angle of the light beam with respect to the normal to the exit surface 913 is represented by $\theta_2$, the exiting angle $\theta_2$ is expressed by the following expression (2) according to Snell's law:

$$\theta_2 = \sin^{-1}(n \sin \theta_1) \qquad (2).$$

Here, in the case that the light beam is vertically incident on the exit surface 913 when the inclination angle of the exit surface 913 is 0°, the incident angle $\theta_1$ and the inclination angle of the exit surface 913 are equal to each other.

That is, when such light beam is incident on the inclined exit surface 913, the exiting angle of the light beam from the exit surface 913 is $(\theta_2 - \theta_1)$, and can be expressed by the following expression (3):

$$\theta_2 - \theta_1 = \sin^{-1}(n \sin \theta_1) - \theta_1 \qquad (3).$$

For example, when a material of the diffusing member 900 is an acryl resin (PMMA), the refractive index n of the diffusing member 900 is 1.49, and the inclination angle $\theta_1$ of the exit surface 913 is 10.0°, the exiting angle $(\theta_2 - \theta_1)$ of the light beam from the exit surface 913 is calculated as 5.0° as shown in FIG. 5A.

On the other hand, when the inclination angle $\theta_1$ of the exit surface 913 is 42.0°, the exiting angle $(\theta_2 - \theta_1)$ of the light beam from the exit surface 913 is calculated as 43.6° as shown in FIG. 5B.

Further, when the inclination angle $\theta_1$ of the exit surface 913 is 42.2° or more, the exiting angle $(\theta_2 - \theta_1)$ of the light beam from the exit surface 913 exceeds the critical angle $\sin^{-1}(1/n)$, so that the light beam incident on the exit surface 913 is totally reflected by the exit surface 913.

That is, for example, when the inclination angle $\theta_1$ of the exit surface 913 is 45.0°, the light beam incident on the exit surface 913 is totally reflected by the exit surface 913 as shown in FIG. 5C. Accordingly, the light beam cannot exit from the exit surface 913, which leads to a loss of light amount.

FIG. 5D shows a graph of a relationship between the inclination angle of the exit surface 913 and the exiting angle of the light beam from the exit surface 913 in the predetermined diffusing member 900.

A solid line and a broken line in FIG. 5D indicate the relationship in the diffusing member 900 formed of an acrylic resin (PMMA, n=1.49) and a polycarbonate resin (PC, n=1.58), respectively.

The following Table 1 shows the relationship between the inclination angle and the exiting angle of the light beam from the exit surface 913 when the inclination angle of the exit surface 913 of the diffusing member 900 formed of the acrylic resin is in the vicinity of 0° and in the vicinity of the critical angle of 42°.

Similarly, the following Table 2 shows the relationship between the inclination angle and the exiting angle of the light beam from the exit surface 913 when the inclination angle of the exit surface 913 in the diffusing member 900 formed of the polycarbonate resin is in the vicinity of 0° and in the vicinity of the critical angle of 39°.

TABLE 1

| Inclination angle | Exiting angle | Variation amount in exiting angle with respect to variation of 0.1° in inclination angle | Value of ratio of variation amounts |
|---|---|---|---|
| 0.0° | 0.00° | (0.05° − 0.00°) = 0.05° | 1.70°/0.05° = 34 |
| 0.1° | 0.05° | | |

TABLE 1-continued

| Inclination angle | Exiting angle | Variation amount in exiting angle with respect to variation of 0.1° in inclination angle | Value of ratio of variation amounts |
|---|---|---|---|
| 42.0° | 43.56° | (45.26° − 43.56°) = 1.70° | |
| 42.1° | 45.26° | | |

TABLE 2

| Inclination angle | Exiting angle | Variation amount in exiting angle with respect to variation of 0.1° in inclination angle | Value of ratio of variation amounts |
|---|---|---|---|
| 0.0° | 0.00° | (0.06° − 0.00°) = 0.06° | 1.69°/0.06° = 28 |
| 0.1° | 0.06° | | |
| 39.1° | 46.08° | (47.77° − 46.08°) = 1.69° | |
| 39.2° | 47.77° | | |

As shown in Tables 1 and 2, a variation amount in the exiting angle of the light beam from the exit surface 913 when the inclination angle of the exit surface 913 is varied by 0.1° is larger in the vicinity of the critical angle than in the vicinity of an inclination angle of 0°.

Specifically, values of ratios of the variation amount when the inclination angle is in the vicinity of the critical angle to the variation amount when the inclination angle is in the vicinity of 0° are 34 and 28 in the diffusing member 900 formed of the acrylic resin and the polycarbonate resin, respectively.

That is, it is preferred to set the frequency of the inclination angles in the vicinity of the critical angle to thirty-four times the frequency of the inclination angles in the vicinity of 0° on the exit surface 913 in order to improve a diffusivity of the light from the exit surface 913 of the diffusing member 900 formed of the acrylic resin.

Here, when light distribution characteristics of a light source is linear light emission such as laser light, it is preferred to set the frequency of the inclination angles in the vicinity of the critical angle to thirty-four times the frequency of the inclination angles in the vicinity of 0° on the exit surface 913 of the diffusing member 900 as described above.

However, in order to improve the diffusivity of the light from the light source 408 having the light distribution characteristics of Lambertian light emission provided in the illuminating devices 403a and 403b, it is preferred to set the frequency of the inclination angles so as to be suitable for the Lambertian light emission.

Specifically, with respect to the inclination angle of the diffusing structure formed on the exit surface 413 of the light guiding body 411 according to the present embodiment, it is preferred to consider an emission angle of the light from the light source 408 up to the radiation angle ω which is particularly important in the illumination of the illuminating devices 403a and 403b as described above.

As described above, the light emitted from the light emitting surface 409 of the light source 408 and having the radiation angle ω is refracted when it is incident on the inside from the incident surface 412 of the light guiding body 411 (PMMA, n=1.49) according to the present embodiment.

Then, the refracted light is incident on the diffusing structure formed on the exit surface 413 at an angle of $\sin^{-1}(\sin \omega/n) = \sin^{-1}(\sin 60°/1.49) = 35.5°$ according to Snell's law.

Here, when an intensity of the strongest light, namely the light at an angle of 0° is set to 1, the intensity of the light at the radiation angle ω is considered to be 0.5. At this time, when the inclination angle at which the frequency is increased 34 times is represented by U, $U=\sin^{-1}(1/n)+(1/2)\times\sin^{-1}(\sin \quad \omega/n)=\sin^{-1}(1/1.49)+(1/2)\times\sin^{-1}(\sin \quad 60°/1.49)=60°$ can be obtained.

Note that, the frequency of the inclination angle U with respect to the frequency of the inclination angles in the vicinity of 0° is indicated as thirty-four times in the above description, but the present invention is not limited thereto.

That is, when the value of the ratio of the frequency of the inclination angles in the vicinity of U, namely in the range U to the frequency of the inclination angles in the vicinity of 0° is 1.5 or more, it is possible to improve the diffusivity of the light on the exit surface 413 of the light guiding body 411 compared to the exit surface 713 subjected to the texturing in the light guiding body 711 according to the comparative example.

Further, it is effective to reduce light totally reflected by the diffusing structure formed on the exit surface 413 in order to suppress a loss of a light amount of the light exiting from the exit surface 413 of the light guiding body 411 according to the present embodiment.

Specifically, when the light distribution characteristics of the light source is the linear light emission such as laser light, the light totally reflected by the diffusing structure can be reduced by setting the inclination angles of the diffusing structure formed on the exit surface 413 to be equal to or less than the critical angle $\sin^{-1}(1/n)$ as described above.

On the other hand, when the light distribution characteristics is Lambertian emission as the light source 408, it is preferred that the light up to the radiation angle ω, which is particularly important in the illumination by the illuminating device 403a and 403b, is incident on the diffusing structure of the exit surface 413 to reduce the light totally reflected by the diffusing structure. Thereby, the light exited with being refracted from the exit surface 413 can be increased.

As described above, the light emitted from the light emitting surface 409 of the light source 408 and having the radiation angle ω is refracted when it is incident on the inside from the incident surface 412 of the light guiding body 411 (PMMA, n=1.49) according to the present embodiment.

Then, the refracted light reaches the diffusing structure formed on the exit surface 413 at an angle of 35.5° according to Snell's law.

Here, when the inclination angle of the diffusing structure formed on the exit surface 413 from which the light having the radiation angle ω can exit is represented by V, $V=\sin^{-1}(1/n)+\sin^{-1}(\sin \omega/n)=78°$ can be obtained.

In this way, the inclination angles in the vicinity of V, namely the range V can be calculated as a range in consideration of the total reflection by the diffusing structure of the light emitted from the light source 408 having the light distribution characteristics of the Lambertian light emission.

It is preferred that the frequency in the vicinity of the inclination angle V, namely the range V is 0 in the diffusing structure formed on the exit surface 413 of the light guiding body 411 according to the present embodiment, but the present invention is not limited thereto.

That is, when the frequency in the range V is 0.5 times or less the frequency in the range U, a decrease in the light amount of the light exiting from the exit surface 413 can be suppressed by reducing the light totally reflected by the diffusing structure.

From the above discussion, the frequency in the range where the inclination angle is 0°±5° in the Y direction on the diffusing structure formed on the exit surface 413 is represented by α, and the frequency in the range where the inclination angle is +U±5° and –U±5° in the Y direction on the diffusing structure formed on the exit surface 413 is represented by β, in the light guiding body 411 according to the present embodiment.

Further, the frequency in the range where the inclination angle is +V±5° and –V±5° in the Y direction on the diffusing structure formed on the exit surface 413 is represented by γ, the following conditional expressions (4) and (5) are satisfied:

$$1.5 \leq \beta/\alpha \leq 35 \tag{4}$$

$$0 \leq \gamma/\beta \leq 0.5 \tag{5}.$$

In other words, α, β and γ represent the frequencies of the inclination angles of 0°±5°, ±U±5° and ±V±5° in the XY cross section at each position on a predetermined line parallel to the Y direction of each protruding portion whose top is arranged on a line parallel to the Y direction when it is projected on the YZ cross section, respectively.

The conditional expression (4) defines the diffusivity of the light exiting from the exit surface 413 by the diffusing structure formed on the exit surface 413 of the light guiding body 411 according to the present embodiment.

That is, it is possible to improve the diffusivity of the light exiting from the exit surface 413 by the diffusing structure formed on the exit surface 413 of the light guiding body 411 according to the present embodiment by satisfying the conditional expression (4).

Thereby, it is possible to suppress a formation of light and dark stripes corresponding to bright light source images LS corresponding to the plurality of light sources 408 formed by specularly reflected light L generated when an image of a glossy original G is read to obtain a good read image.

If the ratio exceeds the upper limit value in the conditional expression (4), the diffusivity of the light exiting from the exit surface 413 by the diffusing structure formed on the exit surface 413 of the light guiding body 411 according to the present embodiment becomes excessive.

In this case, light traveling in a direction parallel to the XZ cross section of light illuminating the read region 401 decreases.

In other words, the light traveling perpendicularly to the main scanning direction (Y direction) decreases, whereas the light traveling obliquely with respect to the main scanning direction (Y direction) increases.

As a result, a portion where a large amount of light reaches and a portion where only a small amount of light reaches are formed along the Y direction in the read region 401, so that the light and dark stripes are formed in the image generated by reading the glossy original G.

On the other hand, if the ratio falls below the lower limit value in the conditional expression (4), the diffusivity of the light exiting from the exit surface 413 by the diffusing structure formed on the exit surface 413 of the light guiding body 411 according to the present embodiment becomes weak.

In this case, the light traveling in a direction parallel to the XZ cross section of the light illuminating the read region 401 increases.

In other words, the light traveling perpendicularly to the main scanning direction (Y direction) increases, whereas the light traveling obliquely with respect to the main scanning direction (Y direction) decreases.

As a result, a portion where a large amount of light reaches and a portion where only a small amount of light reaches are formed along the Y direction in the read region

401, so that the bright and dark stripes are formed in the image generated by reading the glossy original G.

That is, the light uniformly reaches each portion along the Y direction in the read region 401, so that it is possible to suppress the formation of the light and dark stripes by satisfying the conditional expression (4).

The conditional expression (5) defines an available efficiency of light in the light guiding body 411 according to the present embodiment.

That is, it is possible to suppress a decrease in the light amount of the light exiting from the exit surface 413 due to the total reflection of the light by the diffusing structure formed on the exit surface 413 of the light guiding body 411 according to the present embodiment by satisfying the conditional expression (5).

Thereby, the read region 401 of the original G can be efficiently illuminated by the illuminating devices 403a and 403b including the light guiding body 411 according to the present embodiment.

If the frequency of the inclination angles ±V±5° becomes larger than the frequency of the inclination angles ±U±5° so as to exceed the upper limit value of the conditional expression (5), the light totally reflected by the diffusing structure formed on the exit surface 413 of the light guiding body 411 according to the present embodiment increases.

Accordingly, the light amount of the light exiting from the exit surface 413 decreases, so that it is difficult to efficiently illuminate the read region 401 of the original G by the illuminating devices 403a and 403b including the light guiding body 411 according to the present embodiment, which is not preferable.

Further, in the light guiding body 411 according to the present embodiment, it is preferred that the following conditional expression (4a) is satisfied:

$$15 \leq \beta/\alpha \leq 35 \tag{4a}$$

By satisfying the conditional expression (4a), the diffusivity of the light exiting from the exit surface 413 by the diffusing structure formed on the exit surface 413 of the light guiding body 411 according to the present embodiment can be further improved.

Furthermore, in the light guiding body 411 according to the present embodiment, it is preferred that the following conditional expression (5a) is satisfied:

$$0 \leq \gamma/\beta \leq 0.3 \tag{5a}$$

By satisfying the conditional expression (5a), it is possible to further suppress the decrease in the light amount of the light exiting from the exit surface 413 due to the total reflection of the light by the diffusing structure formed on the exit surface 413 of the light guiding body 411 according to the present embodiment.

In the light guiding body 411 according to the present embodiment, $\alpha=4$, $\beta=101$ and $\gamma=0$ per thousand inclination angles on a predetermined line in the Y direction included in the cross section 4A as shown in FIG. 4C.

Accordingly, $\beta/\alpha=25.3$ and $\gamma/\beta=0$, so that the conditional expressions (4), (4a), (5) and (5a) are satisfied.

Here, it is shown that the conditional expressions (4) and (5) are satisfied for $\alpha$, $\beta$ and $\gamma$ on the predetermined line in the Y direction included in the cross section 4A, but the present invention is not limited thereto.

That is, the conditional expressions (4) and (5) may be satisfied for $\alpha$, $\beta$ and $\gamma$ on a predetermined line in the Y direction included in a predetermined cross section spaced away from the cross section 4A in the Z direction.

Figures 6A, 6B:
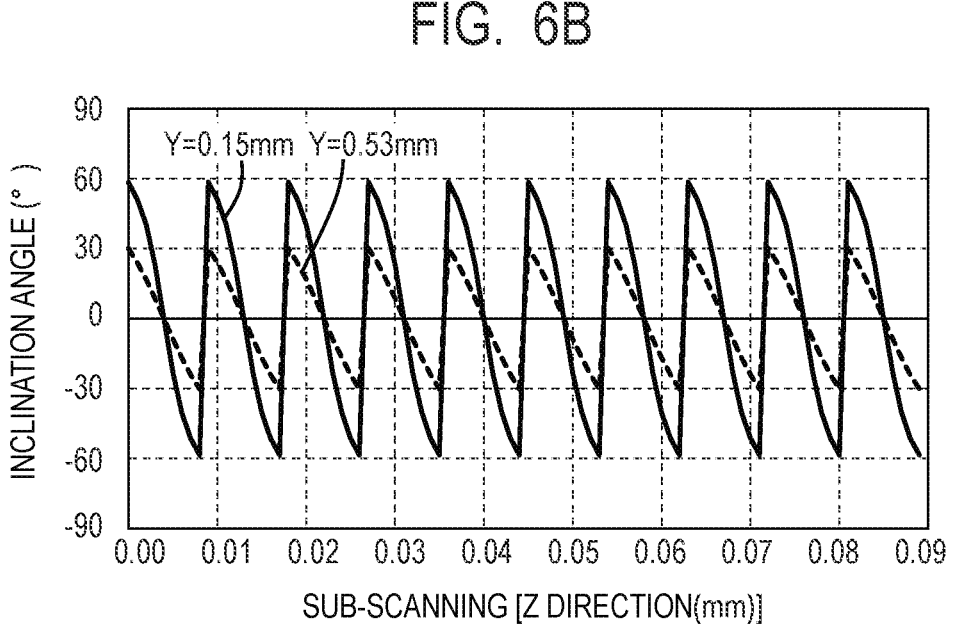
FIG. 6A is a graph showing a positional dependence in a sub-scanning direction of the height in the diffusing structure formed in the light guiding body according to the first embodiment.
FIG. 6B is a graph showing a positional dependence in the sub-scanning direction of the inclination angle in the diffusing structure formed in the light guiding body according to the first embodiment.

FIG. 6A shows a positional dependence in the Z direction of the height H in the ZX cross section (a third cross section) of the diffusing structure formed on the exit surface 413 of the light guiding body 411 according to the present embodiment.

Specifically, FIG. 6A shows the positional dependences in the Z direction of the height H in the ZX cross section including positions of Y=0.15 mm (H=0.042 mm) and Y=0.53 mm (H=0.015 mm) shown in FIG. 4A of the diffusing structure by a solid line and a broken line, respectively.

The ZX cross section referred to herein is parallel to the cross section 6A shown in FIG. 2C.

FIG. 6B shows a positional dependence in the Z direction of the inclination angle in the ZX cross section of the diffusing structure formed on the exit surface 413 of the light guiding body 411 according to the present embodiment.

Specifically, FIG. 6B shows the positional dependences in the Z direction of the inclination angle in the ZX cross section including the positions of Y=0.15 mm and Y=0.53 mm shown in FIG. 4A of the diffusing structure formed on the exit surface 413 of the light guiding body 411 according to the present embodiment by a solid line and a broken line, respectively.

The positional dependence in the Z direction of the inclination angle can be obtained by first order differentiation of the polynomial function expressing each protruding portion described above with respect to the variable Z.

Further, the positional dependence in the Z direction of the inclination angle is not limited thereto, and may be obtained from, for example, a height difference ΔH between two points adjacent to each other at an interval of ΔZ=0.001 mm in the positional dependence in the Z direction of the height H shown in FIG. 6A. That is, in this case, the inclination angle can be calculated from $\tan^{-1}(\Delta H/\Delta Z)$.

As shown in FIG. 6A, respective protruding portions in the diffusing structure formed on the exit surface 413 of the light guiding body 411 according to the present embodiment are arrayed with being continuously connected to each other in the Z direction.

Widths $T_Z$ and intervals $T_Z$ in the Z direction of the respective protruding portions are set to 0.008 mm, which are the same as each other. That is, the width $T_Z$ in the ZX cross section of each protruding portion and the interval $T_Z$ between the protruding portions adjacent to each other in the Z direction are set to be the same as each other.

Further, maximum values of absolute values of the inclination angles in the ZX cross section including the positions of Y=0.15 mm and Y=0.53 mm of the diffusing structure formed on the exit surface 413 of the light guiding body 411 according to the present embodiment are 58.4° and 30.1°, respectively, as shown in FIG. 6B.

It is preferred that the absolute value of each inclination angle in the ZX cross section at each position of the plurality of protruding portions is 78° or less in order to reduce light totally reflected by the diffusing structure formed on the exit surface 413, similarly to each inclination angle in the XY cross section described above.

Here, it is not necessary to consider light and dark stripes corresponding to bright light source images LS corresponding to the plurality of light sources 408 formed by specularly reflected light L generated when an image of a glossy original G is read with respect to the Z direction.

Accordingly, the maximum value of the absolute value of the inclination angle in the ZX cross section is set to 60° or less, unlike the inclination angle in the XY cross section in the light guiding body 411 according to the present embodiment.

Figure 7:
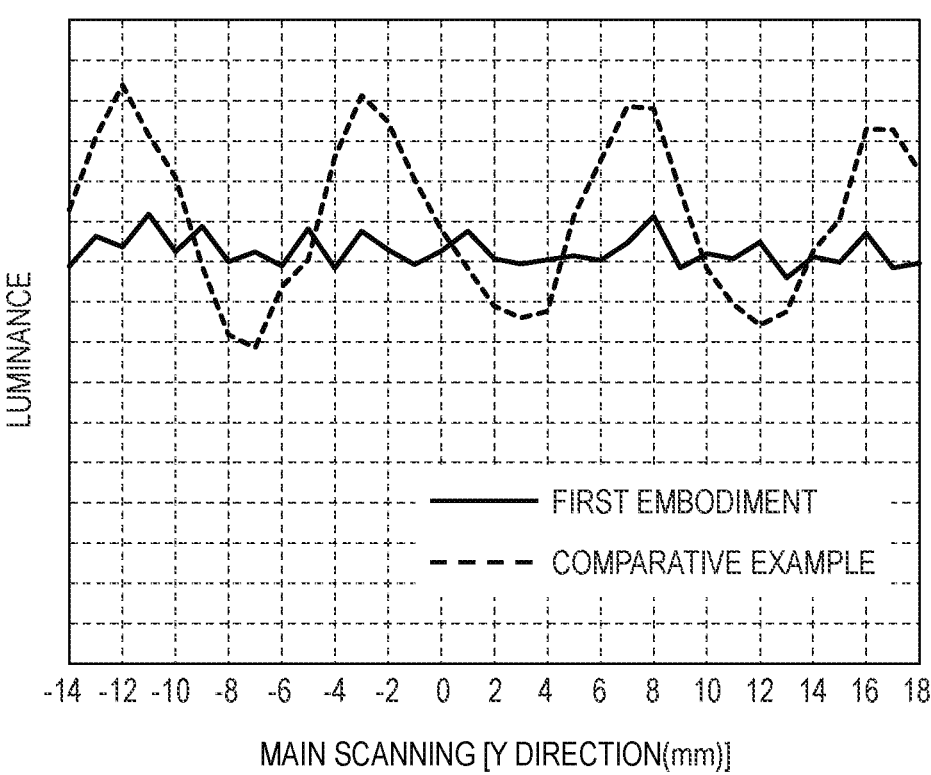
FIG. 7 is a graph showing a positional dependence in the main scanning direction of luminance in an image read by the image reading apparatus with the light guiding body according to the first embodiment.

FIG. 7 shows a positional dependence in the Y direction of luminance at a predetermined position in the Z direction of an image obtained by reading a glossy original G in the image reading apparatus 101 including the light guiding body 411 according to the present embodiment.

In FIG. 7, a positional dependence in the Y direction of the luminance at a predetermined position in the Z direction of the image obtained by reading the glossy original G in the image reading apparatus 111 including the light guiding body 711 according to the comparative example as shown in FIG. 19B is also shown by a broken line.

As shown in FIG. 7, a luminance difference PP is sufficiently small in the read image obtained by the image reading apparatus 101 including the light guiding body 411 according to the present embodiment.

That is, it is understood that the light and dark stripes due to the plurality of bright light source images LS formed in the read image obtained by the image reading apparatus 111 including the light guiding body 711 according to the comparative example are sufficiently reduced in the read image.

As described above, in the light guiding body 411 according to the present embodiment, it is possible to reduce the light and dark stripes corresponding to the plurality of light source images LS by the specularly reflected light L generated in the read region 401 of the original G by forming the diffusing structure satisfying the conditional expressions (4) and (5) on the exit surface 413.

That is, it is possible to improve the diffusivity of the light exiting from the exit surface 413 by the diffusing structure formed on the exit surface 413 with suppressing a decrease in the light amount of the light exiting from the exit surface 413 of the light guiding body 411 according to the present embodiment.

Thereby, it is possible to suppress the formation of the light and dark stripes corresponding to the plurality of light source images LS spaced away from each other in the image obtained when the glossy original G is read in the image reading apparatus 101 including the light guiding body 411 according to the present embodiment.

Second Embodiment

Figure 8:
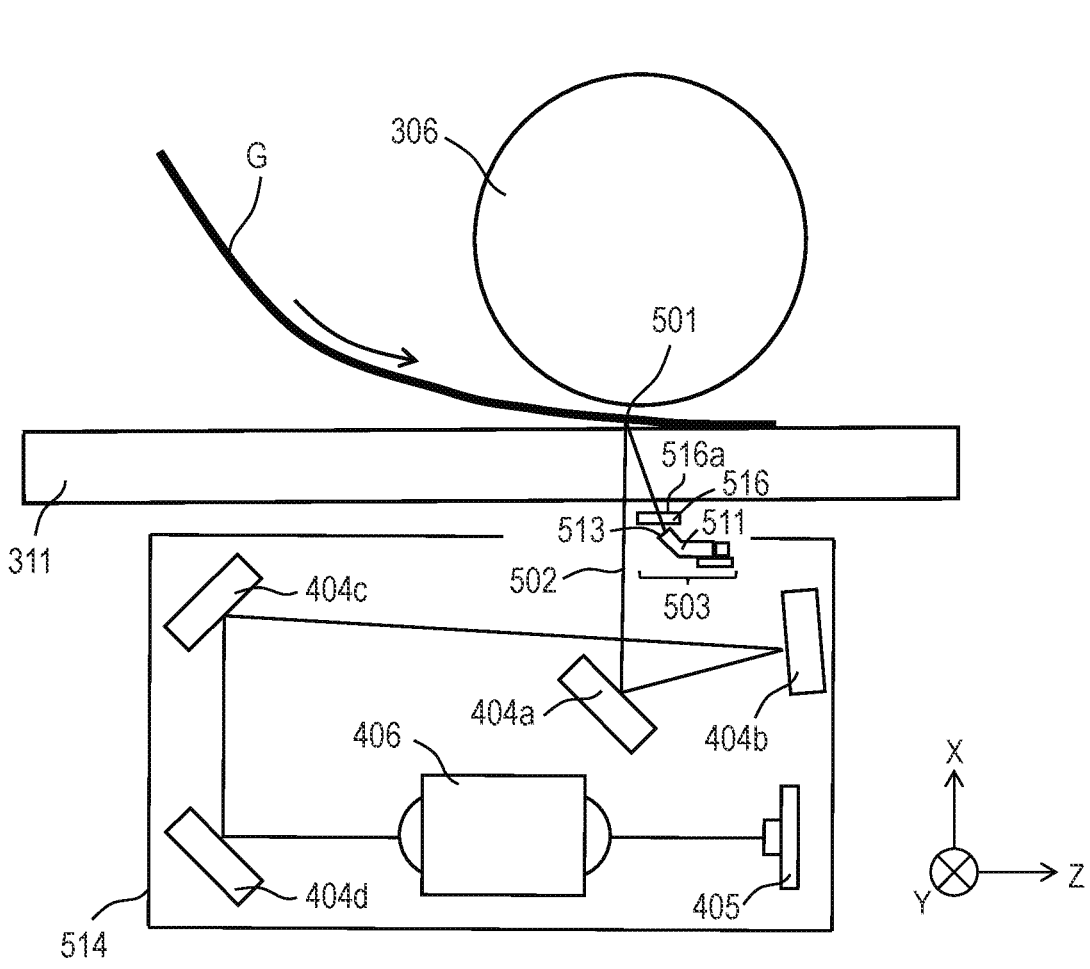
FIG. 8 is an enlarged cross-sectional view of an image reading apparatus with an illuminating device including a diffusing sheet according to a second embodiment of the present invention.

FIG. 8 shows an enlarged cross-sectional view of the vicinity of a first image reading unit 514 of an image reading apparatus 101 provided with the first image reading unit 514 including an illuminating device 503 with a diffusing sheet 516 as a diffusing member according to a second embodiment of the present invention.

In the present embodiment, so-called original feeding-reading is performed in which an image of an original G conveyed by an automatic document feeder (ADF) 201 is read in a state where the first image reading unit 514 is stopped in the image reading apparatus 101.

The illuminating device 503 has the same structure as the illuminating devices 403a and 403b except that a light guiding body 511 is provided instead of the light guiding body 411 according to the first embodiment and the diffusing sheet 516 according to the present embodiment is newly provided. Accordingly, the same members are denoted by the same numerals, and description thereof is omitted.

Specifically, an exit surface 513 of the light guiding body 511 is formed by a mirror surface, and the diffusing sheet 516 according to the second embodiment is arranged between a read region 501 and the exit surface 513 in the illuminating device 503.

The exit surface 513 of the light guiding body 511 is not limited to the mirror surface, and may be a diffusing surface subjected to texturing and having a diffusion angle of about 20°.

The first image reading unit 514 has the same structure as the first image reading unit 314 except that one illuminating device 503 is provided so as to illuminate the read region 501 of the original G from one side with respect to the XY cross section including a reading optical axis 502. Accordingly, the same members are denoted by the same numerals, and description thereof is omitted.

The diffusing sheet 516 according to the present embodiment is long in the Y direction, and a diffusing structure is formed on a surface facing the read region 501 (hereinafter, referred to as a diffusing surface 516a). On the other hand, a surface facing the light guiding body 511 is formed by a mirror surface.

The diffusing sheet 516 according to the present embodiment may be arranged in an inverted manner such that the mirror surface faces the read region 501 and the diffusing surface 516a faces the light guiding body 511.

A material of the diffusing sheet 516 according to the present embodiment is an acrylic resin (PMMA, n=1.49).

Light emitted from a light emitting surface of a light source in the illuminating device 503 is incident on the inside of the light guiding body 511 from an incident surface, and then is guided toward the exit surface 513 with repeating a total reflection by each of a first light guiding surface and a second light guiding surface which face each other in the X direction.

Then, the light exits from the exit surface 513 to pass through the diffusing sheet 516 according to the present embodiment, thereby the linear read region 501 extending in the Y direction on an original surface (an irradiated surface) of an original G is illuminated.

Figure 9A:
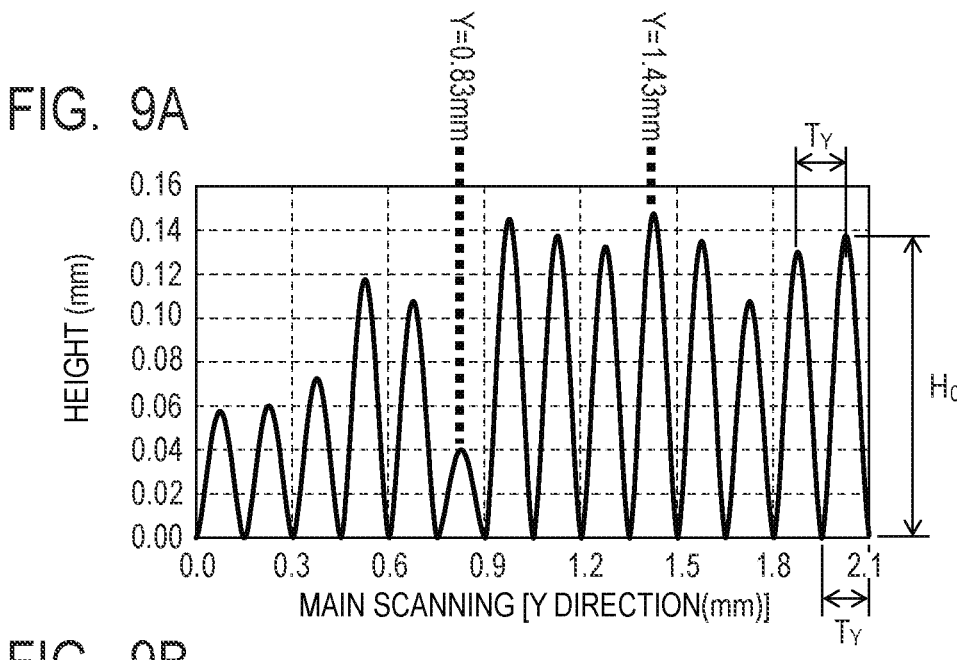
FIG. 9A is a graph showing a positional dependence in the main scanning direction of a height in a diffusing structure formed in the diffusing sheet according to the second embodiment.

FIG. 9A shows a positional dependence in the Y direction of a height H in a predetermined XY cross section of a diffusing structure formed on a diffusing surface 516a of the diffusing sheet 516 according to the present embodiment.

As shown in FIG. 9A, the diffusing surface 516a of the diffusing sheet 516 according to the present embodiment is formed by fourteen kinds of protruding portions (a concave-convex structure), and the fourteen kinds of protruding portions are periodically arrayed with being continuously connected to each other in the Y direction.

Widths $T_Y$ and intervals $T_Y$ in the Y direction of respective protruding portions are set to 0.150 mm, which are the same as each other.

Further, the maximum value $H_0$ of the height of each protruding portion is set between 0.040 mm and 0.148 mm, and the aspect ratio of each protruding portion on the diffusing surface 516a of the diffusing sheet 516 according to the present embodiment is set between 0.3 and 1.0.

If the aspect ratio is more than 1.0, the transferability when the diffusing structure is formed on the diffusing surface 516a of the diffusing sheet 516 according to the present embodiment may become insufficient, which is not preferable.

Further, each protruding portion in the diffusing structure formed on the diffusing surface 516a of the diffusing sheet 516 according to the present embodiment has a rotationally symmetric shape so as to be easily processed by using a mold, and can be expressed by a polynomial function (a mathematical expression).

Specifically, each protruding portion in the diffusing structure formed on the diffusing surface 516a of the diffusing sheet 516 according to the present embodiment is set by using a quartic polynomial function with respect to a position in the Y direction as expressed by the following expression (6):

$$H=H_0[1-(3.40\times10^2)Y^2+(2.88\times10^4)Y^4] \tag{6}$$

Figure 9B:
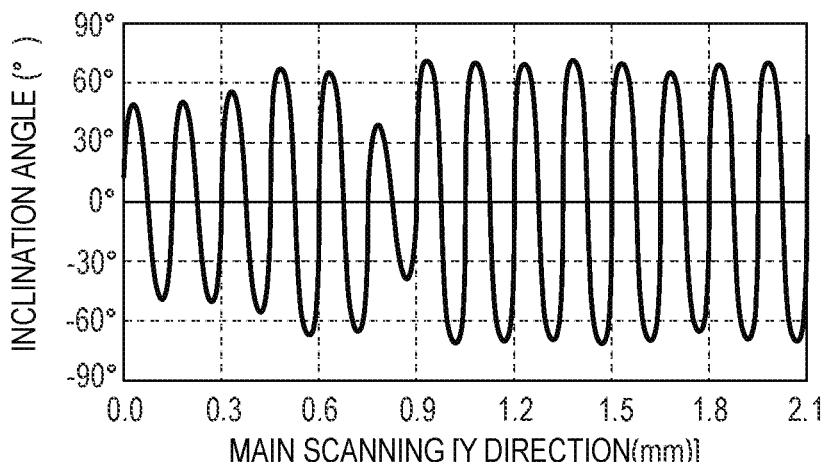
FIG. 9B is a graph showing a positional dependence in the main scanning direction of an inclination angle in the diffusing structure formed in the diffusing sheet according to the second embodiment.

FIG. 9B shows a positional dependence in the Y direction of an inclination angle in a predetermined XY cross section of the diffusing structure formed on the diffusing surface 516a of the diffusing sheet 516 according to the present embodiment.

Figure 9C:
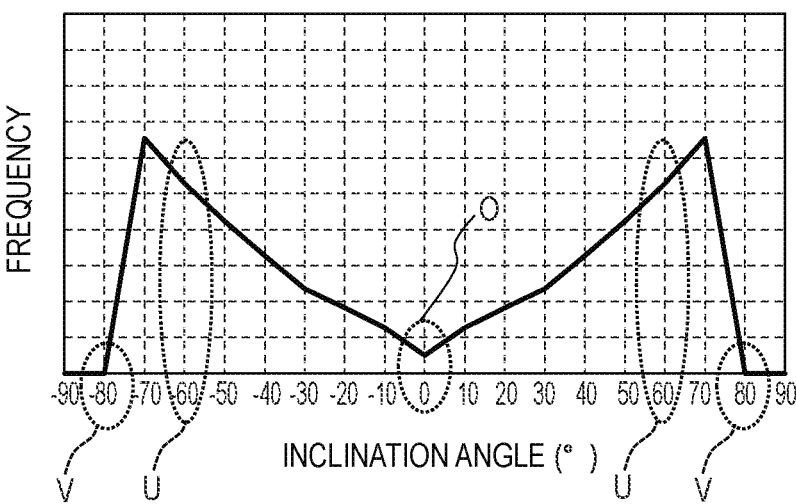
FIG. 9C is a graph showing a frequency of the inclination angle in the diffusing structure formed in the diffusing sheet according to the second embodiment.

FIG. 9C shows a frequency (the number) of the inclination angles. The frequency referred to herein corresponds to the number of the inclination angle when values of the inclination angles are obtained at predetermined intervals in the Y direction in the predetermined XY cross section in the diffusing structure formed on the diffusing surface 516a of the diffusing sheet 516 according to the present embodiment.

Here, a range having the inclination angles of 0°±5° is defined as a range O, a range having the inclination angles of 60°±5° and -60°±5° is defined as a range U, and a range having the inclination angles of 78°±5° and -78°±5° is defined as a range V.

As shown in FIG. 9C, the frequency of the inclination angles in the range U is larger than the frequency of the inclination angles in the range O in the diffusing structure formed on the diffusing surface 516a of the diffusing sheet 516 according to the present embodiment.

Then, in the diffusing sheet 516 according to the present embodiment, $\alpha$=10, $\beta$=106 and $\gamma$=0 per thousand inclination angles on a predetermined line parallel to the Y direction as shown in FIG. 9C.

Accordingly, $\beta/\alpha$=10.6 and $\gamma/\beta$=0, so that the conditional expressions (4), (5) and (5a) are satisfied.

Figure 10A:
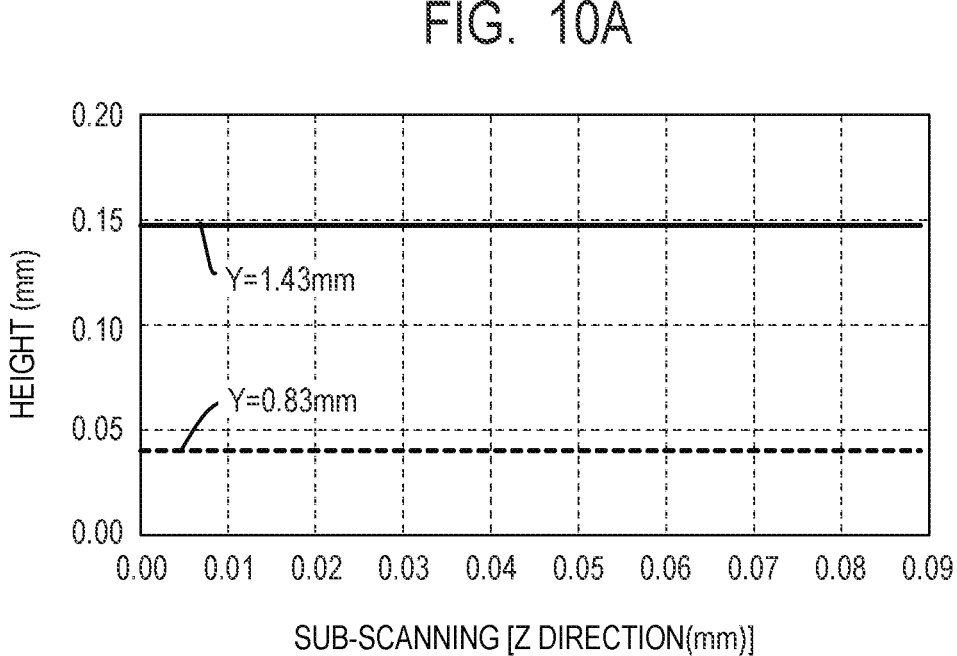
FIG. 10A is a graph showing a positional dependence in the sub-scanning direction of the height in the diffusing structure formed in the diffusing sheet according to the second embodiment.

FIG. 10A shows a positional dependence in the Z direction of the height H in the ZX cross section of the diffusing structure formed on the diffusing surface 516a of the diffusing sheet 516 according to the present embodiment.

Specifically, FIG. 10A shows the positional dependences in the Z direction of the height H in the ZX cross section including positions of Y=1.43 mm (H=0.148 mm) and Y=0.83 mm (H=0.040 mm) shown in FIG. 9A of the diffusing structure by a solid line and a broken line, respectively.

Figure 10B:
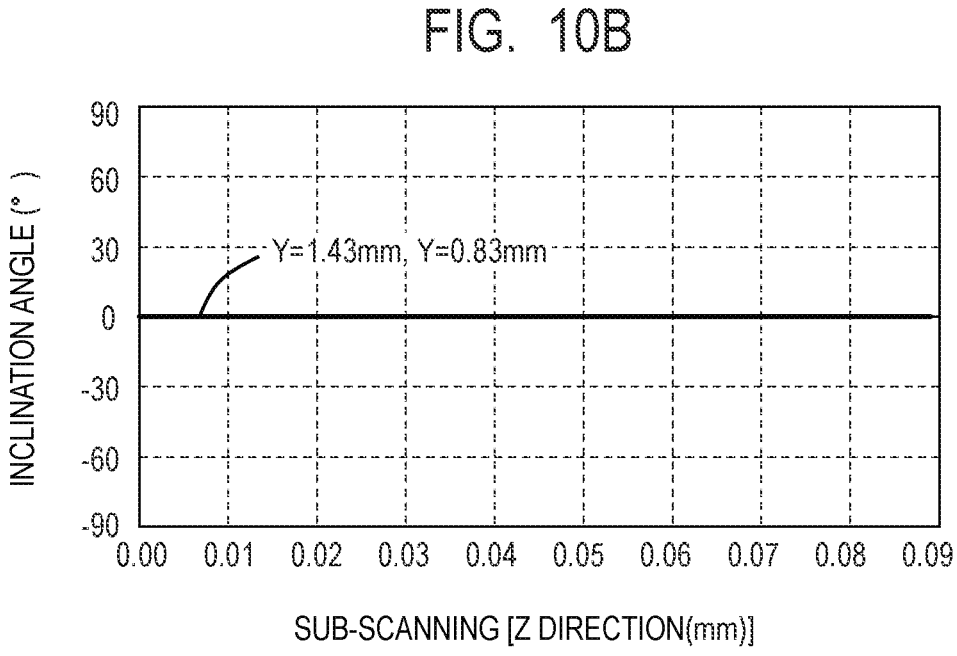
FIG. 10B is a graph showing a positional dependence in the sub-scanning direction of the inclination angle in the diffusing structure formed in the diffusing sheet according to the second embodiment.

FIG. 10B shows a positional dependence in the Z direction of the inclination angle in the ZX cross section of the diffusing structure formed on the diffusing surface 516a of the diffusing sheet 516 according to the present embodiment.

Specifically, FIG. 10B shows the positional dependences in the Z direction of the inclination angle in the ZX cross section including the positions of Y=1.43 mm and Y=0.83 mm shown in FIG. 9A of the diffusing structure formed on the diffusing surface 516a of the diffusing sheet 516 according to the present embodiment by a solid line and a broken line, respectively.

As shown in FIG. 10A, the diffusing structure formed on the diffusing surface 516a of the diffusing sheet 516 according to the present embodiment has the same height in the Z direction, in other words, the height thereof does not vary.

Accordingly, the absolute value of the inclination angle in the ZX cross section in the diffusing structure formed on the diffusing surface 516a of the diffusing sheet 516 according to the present embodiment is 0° at any position of the plurality of protruding portions as shown in FIG. 10B.

As described above, it is preferred that the absolute value of the inclination angle in the ZX cross section of each protruding portion is 78° or less in order to reduce light totally reflected by the diffusing structure.

Then, in the diffusing structure formed on the diffusing surface 516a of the diffusing sheet 516 according to the present embodiment, for example, the maximum inclination angle in the Z direction in the ZX cross section including the positions of Y=1.43 mm and Y=0.83 mm is 0°, so that the above structure is satisfied.

Further, it is not necessary to consider light and dark stripes due to bright light source images LS corresponding to a plurality of light sources formed by specularly reflected light L generated when an image of a glossy original G is read with respect to the Z direction.

Accordingly, the maximum value of the absolute value of the inclination angle in the ZX cross section is set to 60° or less in order to improve a diffusivity of light from a light source having light distribution characteristics of Lambertian light emission, differently from the inclination angle in the XY cross section, in the diffusing sheet 516 according to the present embodiment.

Figure 11:
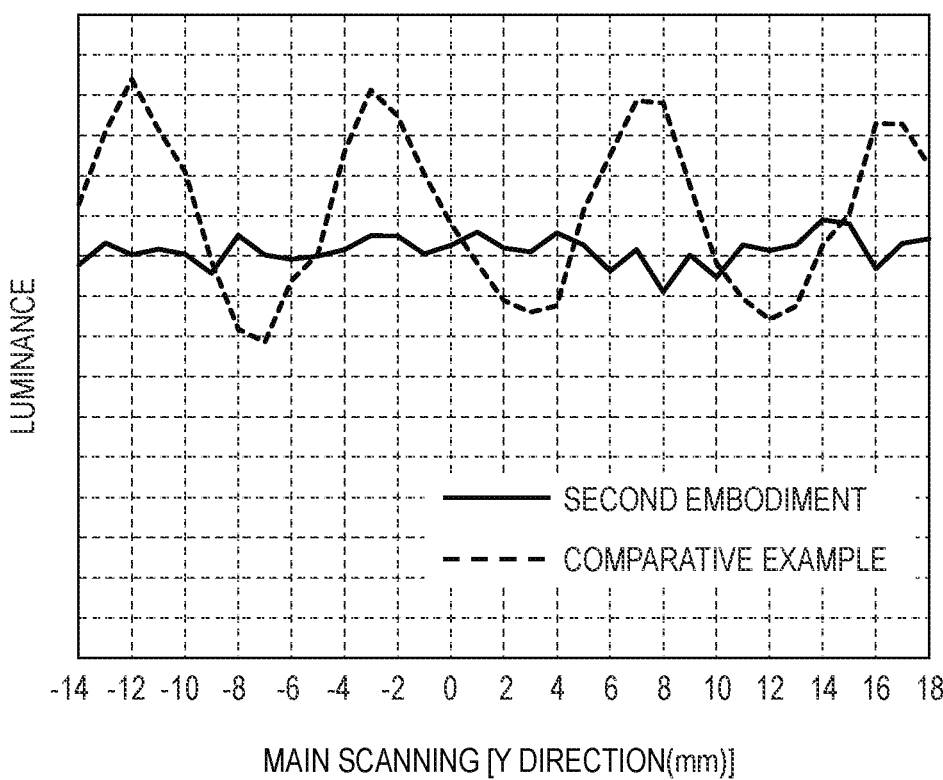
FIG. 11 is a graph showing a positional dependence in the main scanning direction of luminance in an image read by the image reading apparatus with the diffusing sheet according to the second embodiment.

FIG. 11 shows a positional dependence in the Y direction of luminance at a predetermined position in the Z direction of an image obtained by reading a glossy original G in the image reading apparatus 101 including the diffusing sheet 516 according to the present embodiment.

In FIG. 11, a positional dependence in the Y direction of the luminance at a predetermined position in the Z direction of the image obtained by reading the glossy original G in the image reading apparatus 111 including the light guiding body 711 according to the comparative example shown in FIG. 19B is also shown by a broken line.

As shown in FIG. 11, the luminance difference PP is sufficiently small in the read image obtained by the image reading apparatus 101 including the diffusing sheet 516 according to the present embodiment.

That is, it is understood that the light and dark stripes corresponding to the plurality of bright light source images LS formed in the read image obtained by the image reading apparatus 111 including the light guiding body 711 according to the comparative example are sufficiently reduced in the read image.

As described above, in the diffusing sheet 516 according to the present embodiment, it is possible to reduce the light and dark stripes corresponding to the plurality of light source images LS by the specularly reflected light L generated in the read region 501 of the original G by forming the diffusing structure satisfying the conditional expressions (4) and (5) on the diffusing surface 516a.

That is, it is possible to improve the diffusivity of the light exiting from the diffusing surface 516a by the diffusing structure formed on the diffusing surface 516a with suppressing a decrease in the light amount of the light passing through the diffusing surface 516a of the diffusing sheet 516 according to the present embodiment.

Thereby, it is possible to suppress the formation of the light and dark stripes corresponding to the plurality of light source images LS spaced away from each other in the image obtained when the glossy original G is read in the image reading apparatus 101 including the diffusing sheet 516 according to the present embodiment.

Third Embodiment

First, an image reading apparatus 111 provided with a second image reading unit 715 with illuminating devices 703a and 703b each including the light guiding body 711 according to the comparative example is described.

Note that the illuminating devices 703a and 703b have the same structure as illuminating devices 603a and 603b described later except that the light guiding body 711 according to the comparative example is provided instead of a light guiding body 611 as the diffusing member according to a third embodiment of the present invention.

Further, the second image reading unit 715 has the same structure as that of a second image reading unit 315 described later except that illuminating devices 703a and 703b are provided instead of the illuminating devices 603a and 603b.

Furthermore, the image reading apparatus 111 has the same structure as that of the image reading apparatus 101 described later except that the second image reading unit 715 is provided instead of the second image reading unit 315.

As described later, the second image reading unit 715 performs the original feeding-reading for reading an image of a rear surface of the original G conveyed by the ADF 201.

Figure 20:
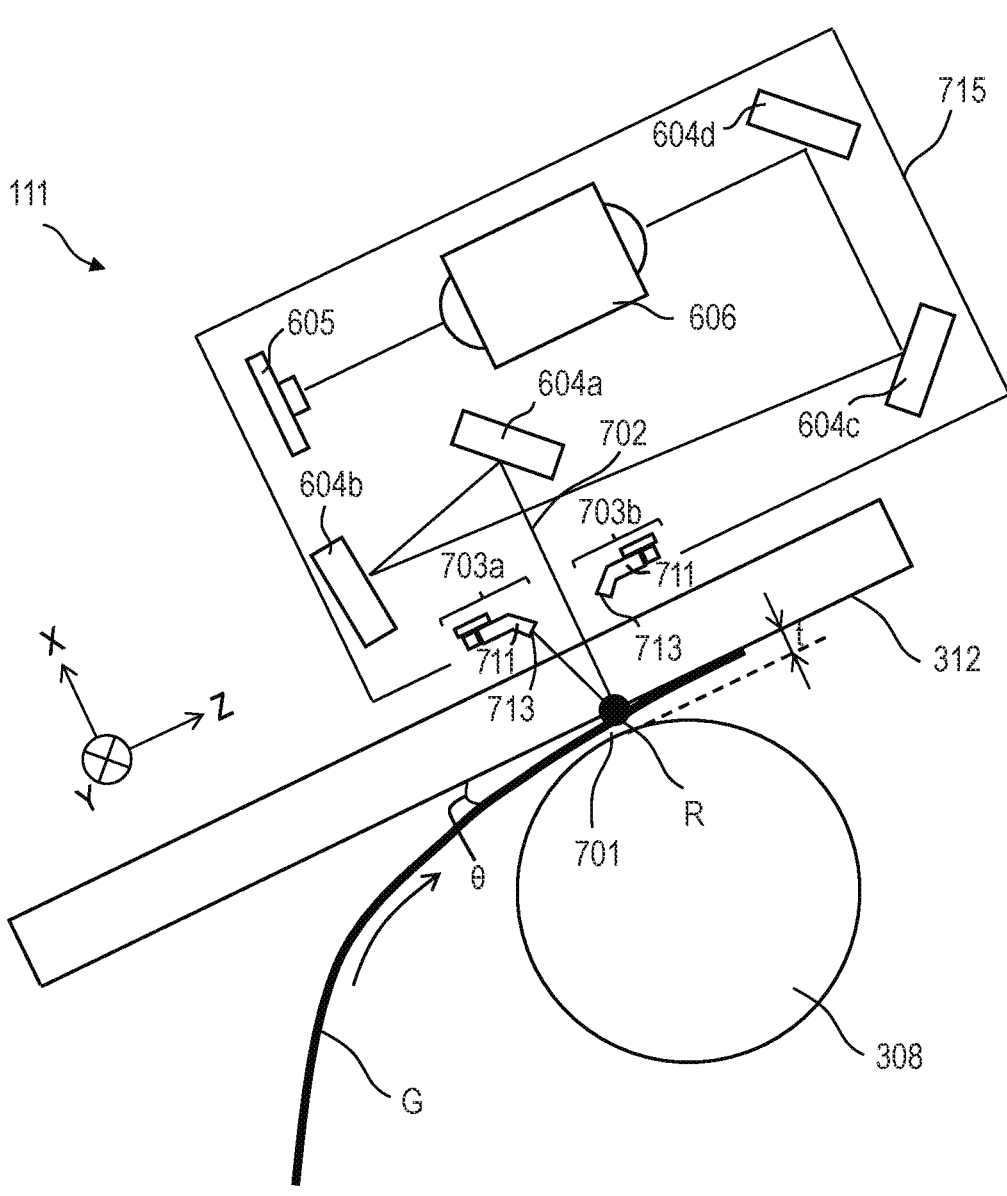
FIG. 20 is an enlarged cross-sectional view of the image reading apparatus with the illuminating device including the light guiding body according to the comparative example.

FIG. 20 shows an enlarged cross-sectional view of the vicinity of the second image reading unit 715 of the image reading apparatus 111.

Figure 21A:
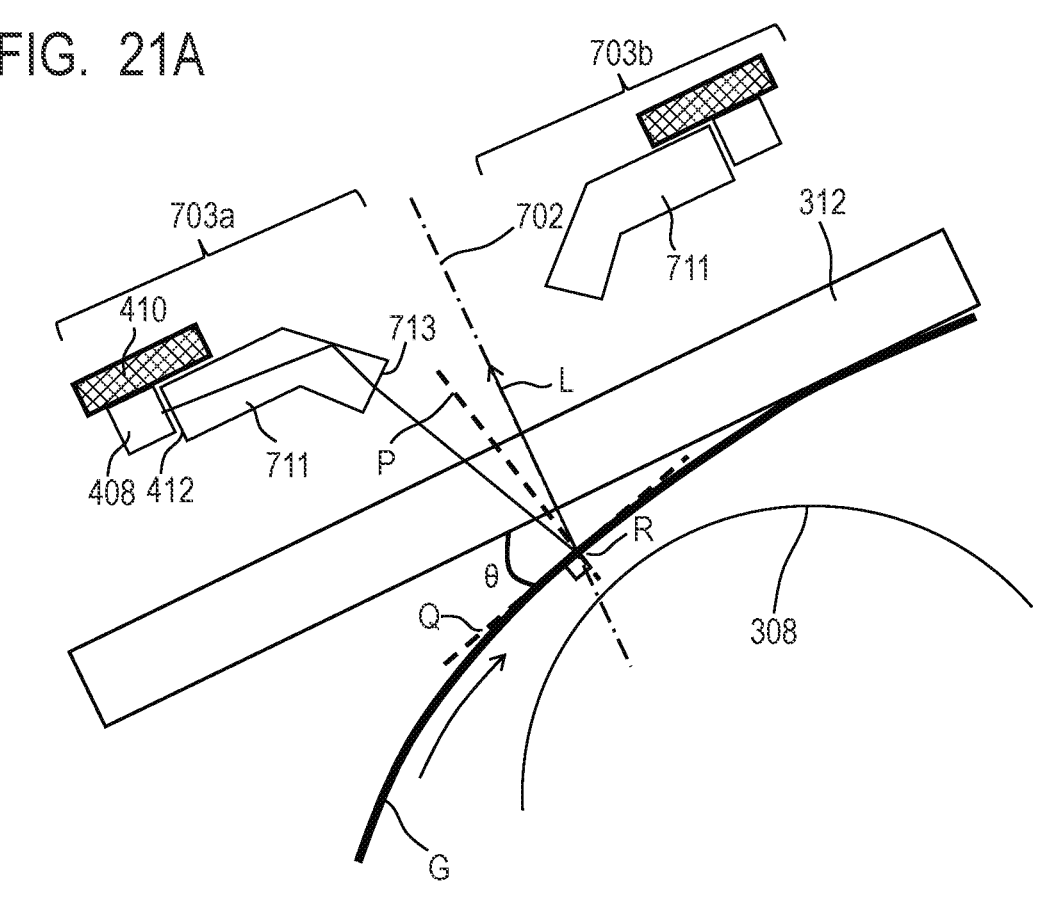
FIG. 21A is an enlarged cross-sectional view of the image reading apparatus with the illuminating device including the light guiding body according to the comparative example.
Figure 21B:
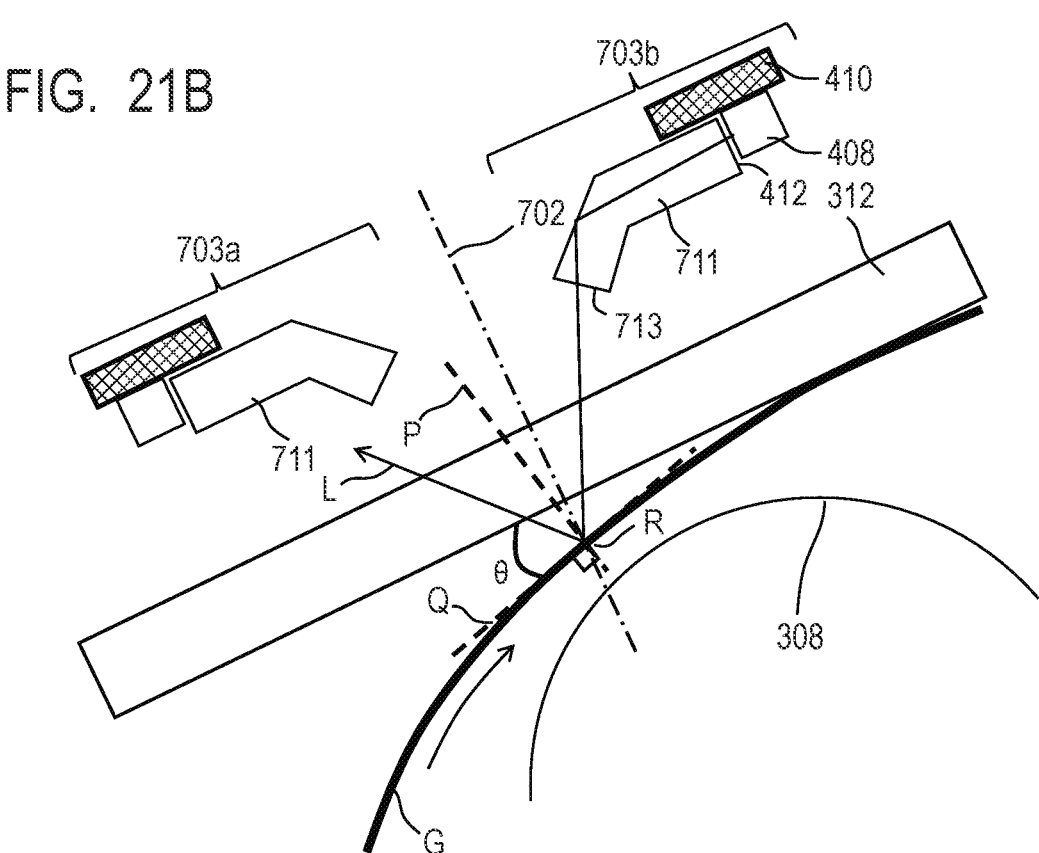
FIG. 21B is an enlarged cross-sectional view of the image reading apparatus with the illuminating device including the light guiding body according to the comparative example.

FIGS. 21A and 21B show enlarged cross-sectional views of the image reading apparatus 111 illustrating the illuminating devices 703a and 703b in an enlarged manner, and illustrate a state in which light emitted from the illuminating devices 703a and 703b is reflected by the original G, respectively.

As shown in FIG. 20, the illuminating devices 703a and 703b provided in the second image reading unit 715 illuminate the original G, specifically a read region 701 on the rear surface of the original G through a second platen glass 312 in the image reading apparatus 111.

Next, diffusely reflected light from the original G is reflected by a first folding mirror 604a, a second folding mirror 604b, a third folding mirror 604c and a fourth folding mirror 604d.

Then, the diffusely reflected light is guided (condensed) onto a light receiving unit 605 (an image reading sensor, a second light receiving unit) by an imaging optical system 606 (a reduction optical system, a second optical system).

Thereby, image information of the illuminated portion of the original surface (the rear surface) of the original G, namely the read region 701 (a second reading position) is obtained.

Then, the light receiving unit 605 can read image information of the entire original surface (the entire rear surface) of the original G in a line sequential manner by conveying the original G.

As shown in FIG. 20, the second platen glass 312 is provided so as to include the reading position R of the image of the rear surface of the conveyed original G in the image reading apparatus 111.

The reading position R is not limited to the second platen glass 312, and may be included in a paper surface of the original G conveyed to an interval t between the second platen glass 312 and a second platen roller 308, which is provided to correspond to various types of originals G such as a plain paper, a thick paper and a thin paper.

On the other hand, when the conveyed original G is the plain paper, the original G is inclined at an inclination angle θ with respect to the second platen glass 312 at the reading position R since the interval t is provided so as to correspond to the variety of the originals G as described above.

That is, as shown in FIG. 20, when the rear surface of the original G is read by the second image reading unit 715, the original G may be inclined with respect to the second platen glass 312 in the sub-scanning cross section (the ZX cross section) at the reading position R.

Then, for example, in a case where the original G is a glossy original with the same thickness as the plain paper, specularly reflected light L generated by the light emitted from the illuminating device 703a being reflected at the reading position R of the original G may travel along the reading optical axis 702 of the second image reading unit 715.

In other words, as shown in FIG. 21A, when the original G is in a predetermined posture at the reading position R, namely when the original G has a predetermined tangential line Q (a normal line P) at the reading position R, the specularly reflected light L by the illuminating device 703a may travel along the reading optical axis 702.

In this case, the generated specularly reflected light L is reflected by the first folding mirror 604a to the fourth folding mirror 604d, and then condensed on the light receiving unit 605 by the imaging optical system 606.

Thereby, bright light source images LS corresponding to the plurality of light sources 408, which are particularly bright portions and are arranged so as to be spaced away from each other, are formed and appear as light and dark stripes in the read image.

Figure 22A:
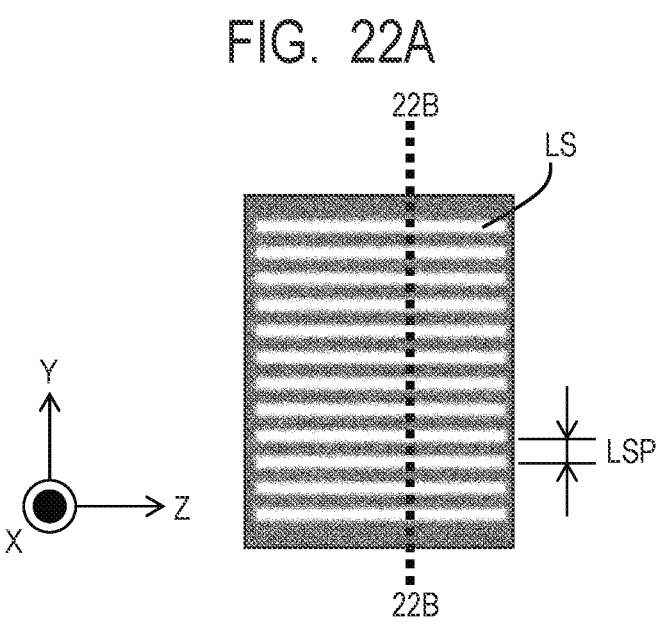
FIG. 22A is a view illustrating an image read by the image reading apparatus including the light guiding body according to the comparative example.

FIG. 22A schematically shows an image read by the second image reading unit 715 in the image reading apparatus 111.

Figure 22B:
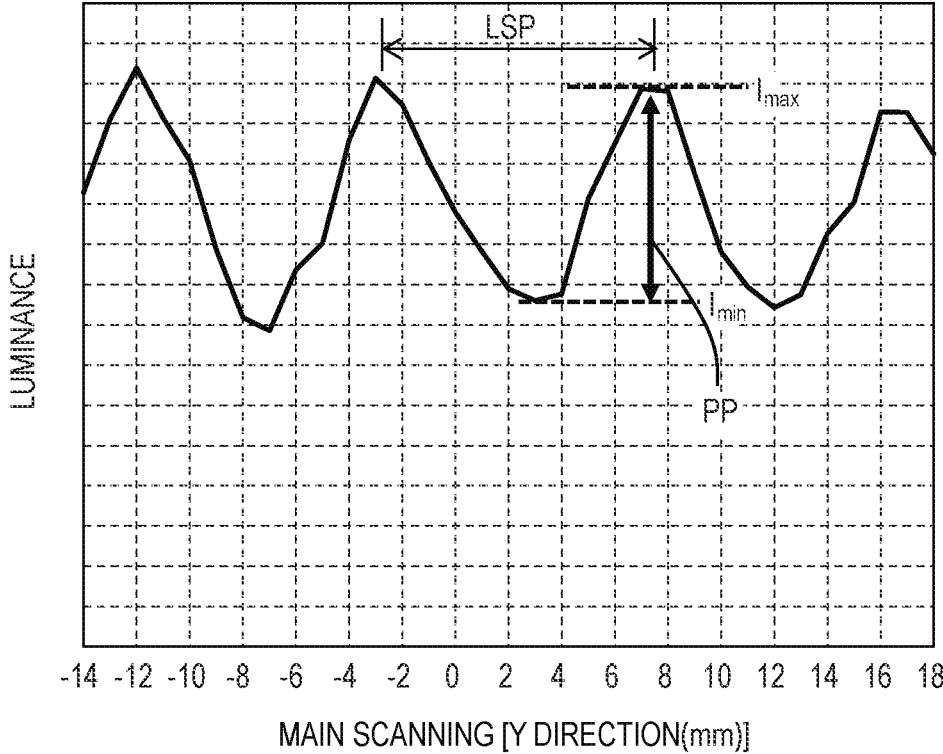
FIG. 22B is a graph showing a positional dependence in the main scanning direction of luminance in the image read by the image reading apparatus with the light guiding body according to the comparative example.

FIG. 22B shows a position dependence in the Y direction of luminance in line 22B shown in the FIG. 22A of the read image.

As shown in FIG. 22A, the light and dark stripes corresponding to the plurality of light sources 708 generated by the specularly reflected light L appear in the image read by the image reading apparatus 111 as described above.

Here, the light and dark stripes corresponding to the plurality of light sources 708 appear as a plurality of streaks in the read image since the original G is conveyed.

Then, as shown in FIG. 22B, a peak structure of the luminance corresponding to each light source image LS appears clearly on the line 22B.

As described above, an exit surface 713 of the light guiding body 711 according to the comparative example is subjected to texturing, so that an diffusion angle in the main scanning direction of light exiting from the light guiding body 711 is about 20°.

That is, even if the known texturing is performed on the exit surface 713 of the light guiding body 711 according to the comparative example, a diffusion in the main scanning direction of the light exiting from the exit surface 713 is not sufficient.

In other words, as shown in FIG. 22B, the light and dark stripes appear remarkably since the luminance difference PP in each peak structure is large.

On the other hand, as shown in FIG. 21B, an emission direction of the specularly reflected light L generated by light emitted from the illuminating device 703b being reflected at the reading position R of the original G does not coincide with the reading optical axis 702.

In this case, the light and dark stripes corresponding to the bright light source images LS formed corresponding to the plurality of light sources 408 do not appear in the read image.

Accordingly, the exit surface 713 of the light guiding body 711 provided in the illuminating device 703b may be subjected to known texturing or may be formed into a mirror surface.

Figure 12:
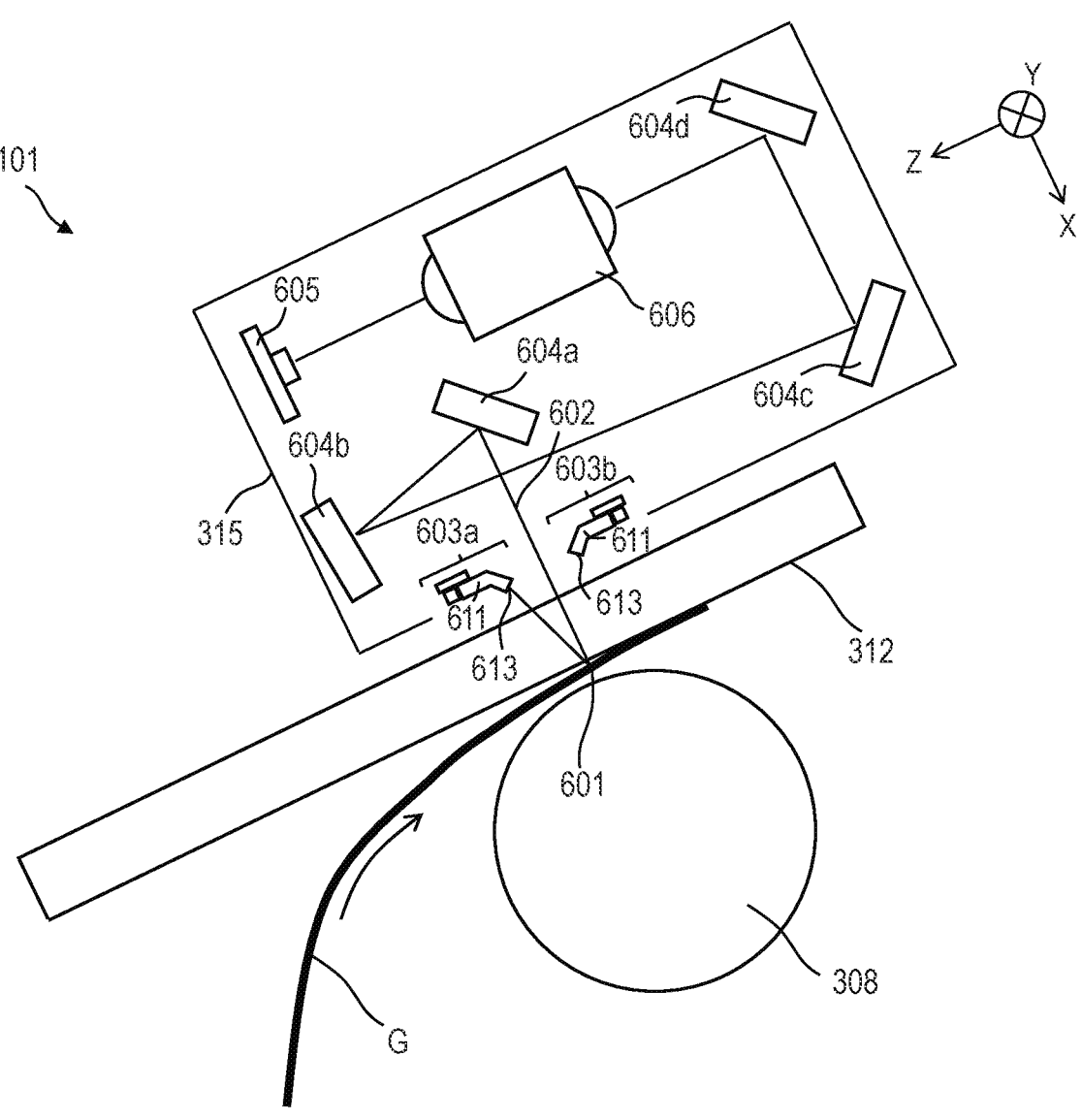
FIG. 12 is an enlarged cross-sectional view of an image reading apparatus with an illuminating device including a light guiding body according to a third embodiment of the present invention.

FIG. 12 shows an enlarged cross-sectional view of the vicinity of the second image reading unit 315 of the image reading apparatus 101 provided with the second image reading unit 315 with the illuminating devices 603a and 603b each including the light guiding body 611 according to the third embodiment.

The exit surface 613 of the light guiding body 611 according to the present embodiment provided in the illuminating devices 603a and 603b has a diffusing structure (a concave-convex structure) that causes the light guided by the light guiding body 611 after being emitted from the light emitting surface 409 of the light source 408 to diffusely exit.

As described above, the exit surface 613 of the light guiding body 611 provided in the illuminating device 603b may be subjected to known texturing or may be formed as a mirror surface since there is no possibility that the specularly reflected light L by the illuminating device 603b travels along the reading optical axis 602.

Further, a polycarbonate resin (PC, n=1.58) is used as a material of the light guiding body 611 according to the present embodiment.

Figure 13A:
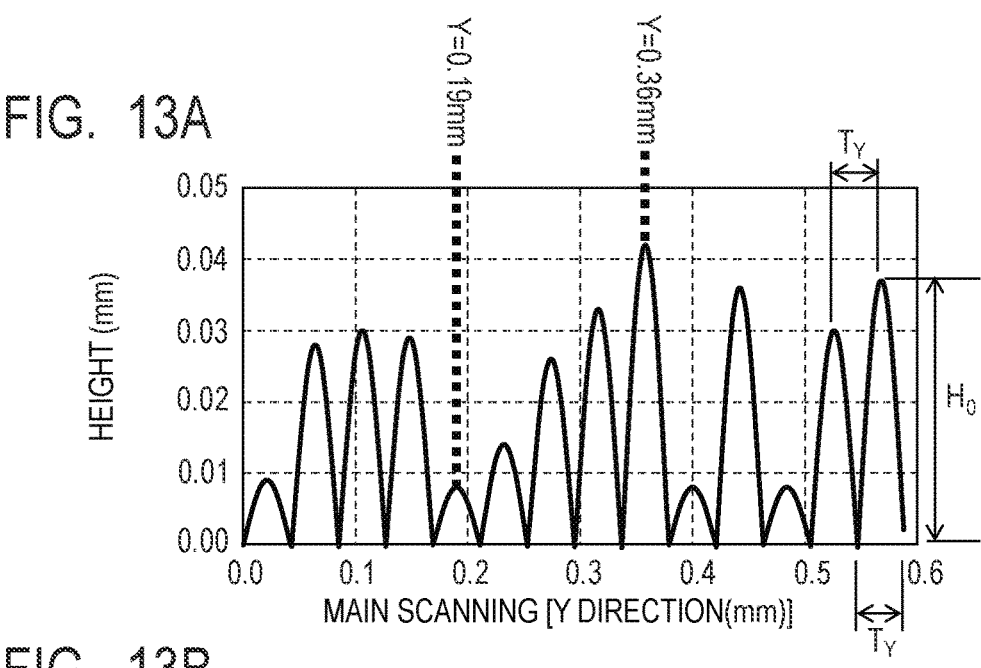
FIG. 13A is a graph showing a positional dependence in the main scanning direction of a height in a diffusing structure formed in the light guiding body according to the third embodiment.

FIG. 13A shows a positional dependence in the Y direction of a height H in a predetermined XY cross section of the diffusing structure formed on the exit surface 613 of the light guiding body 611 according to the present embodiment.

As shown in FIG. 13A, the exit surface 613 of the light guiding body 611 according to the present embodiment includes fourteen kinds of protruding portions (the concave-convex structure), and the fourteen kinds of protruding portions are periodically arrayed with continuously connected to each other in the Y direction.

Widths $T_Y$ and intervals $T_Y$ in the Y direction of the respective protruding portions are set to 0.042 mm, which are the same as each other.

Further, a maximum value $H_0$ of the height of each protruding portion is set between 0.008 mm and 0.042 mm, and an aspect ratio of each protruding portion on the exit surface 613 of the light guiding body 611 according to the present embodiment is set between 0.2 and 1.0.

If the aspect ratio is more than 1.0, a transferability when the diffusing structure is formed on the exit surface 613 of the light guiding body 611 according to the present embodiment may become insufficient, which is not preferable.

Each protruding portion in the diffusing structure formed on the exit surface 613 of the light guiding body 611 according to the present embodiment has a rotationally symmetric shape so as to be easily processed by using a mold, and can be expressed by a polynomial function (a mathematical expression).

Specifically, each protruding portion in the diffusing structure formed on the exit surface 613 of the light guiding body 611 according to the present embodiment is set by using a quartic polynomial function with respect to a position in the Y direction as expressed by the following expression (7):

$$H=H_0[1-(3.00\times10^3)Y^2+(1.60\times10^6)Y^4] \tag{7}$$

Figure 13B:
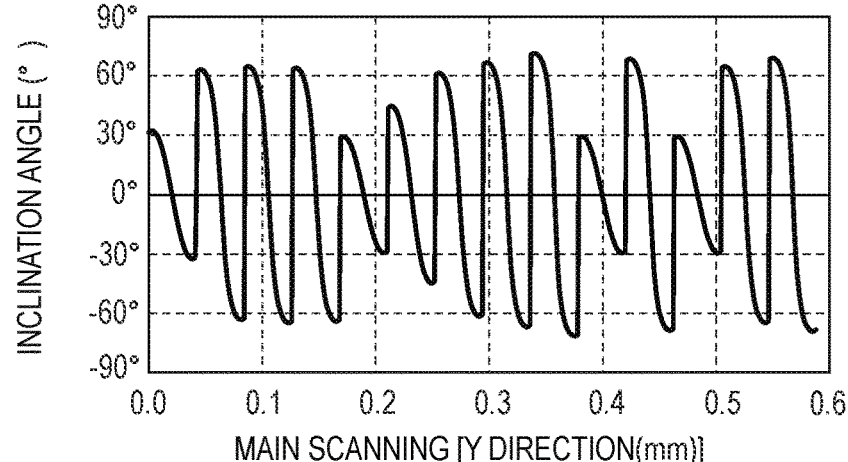
FIG. 13B is a graph showing a positional dependence in the main scanning direction of an inclination angle in the diffusing structure formed in the light guiding body according to the third embodiment.

FIG. 13B shows a positional dependence in the Y direction of an inclination angle in a predetermined XY cross section of the diffusing structure formed on the exit surface 613 of the light guiding body 611 according to the present embodiment.

Figure 13C:
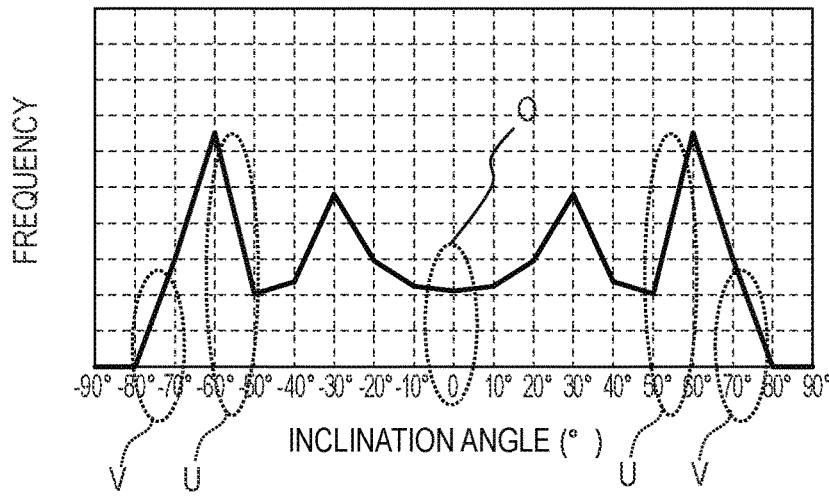
FIG. 13C is a graph showing a frequency of the inclination angle in the diffusing structure formed in the light guiding body according to the third embodiment.

FIG. 13C shows a frequency (the number) of the inclination angles. The frequency referred to herein corresponds to the number of inclination angles when values of the inclination angles are obtained at predetermined intervals in the Y direction in the predetermined XY cross section in the diffusing structure formed on the exit surface 613 of the light guiding body 611 according to the present embodiment.

Here, a range having an inclination angles of 0°±5° is defined as a range O, a range having inclination angles of 56°±5° and −56°±5° is defined as a range U, and a range having inclination angles of 73°±5° and −73°±5° is defined as a range V.

As shown in FIG. 13C, in the diffusing structure formed on the exit surface 613 of the light guiding body 611 according to the present embodiment, the frequency of the inclination angles in the range U is larger than the frequency of the inclination angles in the range O.

Then, in the light guiding body 611 according to the present embodiment, α=42, β=66 and γ=33 per thousand inclination angles on a predetermined line parallel to the Y direction as shown in FIG. 13C.

Accordingly, β/α=1.6 and γ/β=0.5, so that the conditional expressions (4) and (5) are satisfied.

Figure 14A:
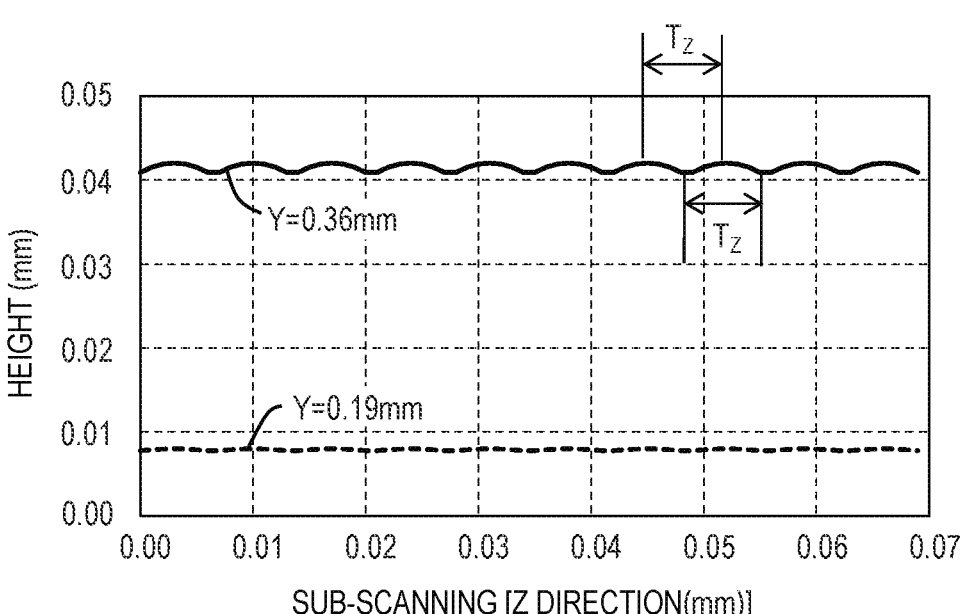
FIG. 14A is a graph showing a positional dependence in the sub-scanning direction of the height in the diffusing structure formed in the light guiding body according to the third embodiment.

FIG. 14A shows a positional dependence in the Z direction of the height H in the ZX cross section of the diffusing structure formed on the exit surface 613 of the light guiding body 611 according to the present embodiment.

Specifically, FIG. 14A shows the positional dependences in the Z direction of the height H in the ZX cross section including positions of Y=0.36 mm (H=0.042 mm) and Y=0.19 mm (H=0.008 mm) shown in FIG. 13A of the diffusing structure by a solid line and a broken line, respectively.

Figure 14B:
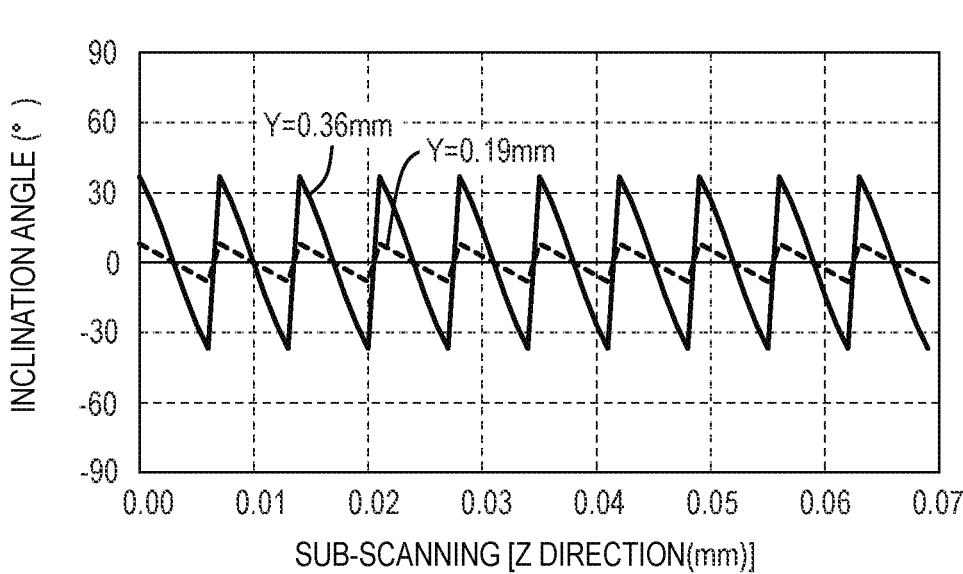
FIG. 14B is a graph showing a positional dependence in the sub-scanning direction of the inclination angle in the diffusing structure formed in the light guiding body according to the third embodiment.

FIG. 14B shows a positional dependence in the Z direction of the inclination angle in the ZX cross section of the diffusing structure formed on the exit surface 613 of the light guiding body 611 according to the present embodiment.

Specifically, FIG. 14B shows the positional dependences in the Z direction of the inclination angle in the ZX cross section including the positions of Y=0.36 mm and Y=0.19 mm shown in FIG. 13A of the diffusing structure formed on the exit surface 613 of the light guiding body 611 according to the present embodiment by a solid line and a broken line, respectively.

As shown in FIG. 14A, the protruding portions in the diffusing structure formed on the exit surface 613 of the light guiding body 611 according to the present embodiment are continuously connected to each other in the Z direction.

Widths $T_Z$ and intervals $T_Z$ in the Z direction of the respective protruding portions are set to 0.006 mm, which are the same as each other.

Further, as shown in FIG. 14B, maximum values of absolute values of the inclination angles in the ZX cross section including the positions of Y=0.36 mm and Y=0.19 mm of the diffusing structure formed on the exit surface 613 of the light guiding body 611 according to the present embodiment are 36.8° and 8.1°, respectively.

It is preferred that the absolute value of the inclination angle in the ZX cross section at each position of the plurality of protruding portions is 73° or less in order to reduce light totally reflected by the diffusing structure formed on the exit surface 613, similarly to the inclination angle in the XY cross section.

Further, it is not necessary to consider light and dark stripes due to bright light source images (mirror images) LS corresponding to the plurality of light sources 408 formed by specularly reflected light L generated when an image of a glossy original G is read with respect to the Z direction.

Accordingly, the maximum value of the absolute value of the inclination angle in the ZX cross section is set to 56° or less in order to improve a diffusivity of light from the light source having light distribution characteristics of Lambertian light emission, unlike the inclination angle in the XY cross section in the light guiding body 611 according to the present embodiment.

Figure 15:
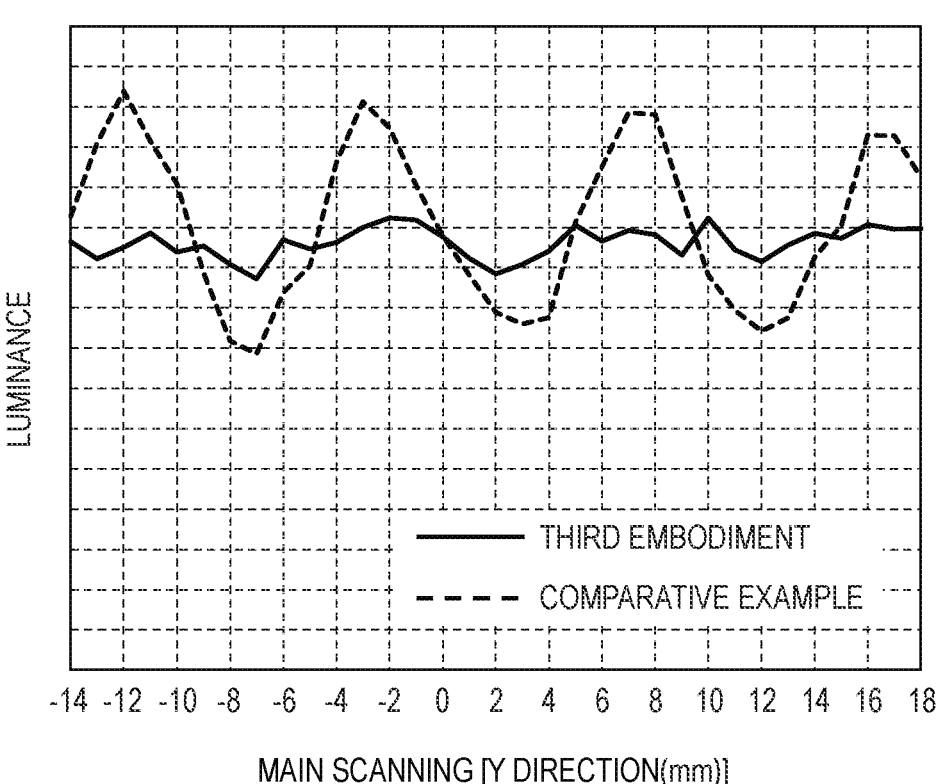
FIG. 15 is a graph showing a positional dependence in the main scanning direction of luminance in an image read by the image reading apparatus with the light guiding body according to the third embodiment.

FIG. 15 shows a positional dependence in the Y direction of luminance at a predetermined position in the Z direction of an image obtained by reading a glossy original G in the image reading apparatus 101 including the light guiding body 611 according to the present embodiment.

In FIG. 15, a positional dependence in the Y direction of the luminance at a predetermined position in the Z direction of the image obtained by reading the glossy original G in the image reading apparatus 111 including the light guiding body 711 according to the comparative example shown in FIG. 19B is also shown by a broken line.

As shown in FIG. 15, the luminance difference PP is sufficiently small in the read image obtained by the image reading apparatus 101 including the light guiding body 611 according to the present embodiment.

That is, it is understood that the light and dark stripes corresponding to the plurality of bright light source images LS formed in the read image obtained by the image reading apparatus 111 including the light guiding body 711 according to the comparative example are sufficiently reduced in the read image.

As described above, in the light guiding body 611 according to the present embodiment, it is possible to reduce the light and dark stripes corresponding to the plurality of light source images LS by specularly reflected light L generated in the read region 601 of an original G by forming the diffusing structure satisfying the conditional expressions (4) and (5) on the exit surface 613.

That is, it is possible to improve a diffusivity of light exiting from the exit surface 613 by the diffusing structure formed on the exit surface 613 with suppressing a decrease in a light amount of the light passing through the exit surface 613 of the light guiding body 611 according to the present embodiment.

Thereby, it is possible to suppress the formation of the light and dark stripes corresponding to the plurality of light source images LS spaced away from each other in an image obtained when the glossy original G is read in the image reading apparatus 101 including the light guiding body 611 according to the present embodiment.

Note that it can also be interpreted that the light guiding bodies according to the first embodiment and the third embodiment described above are formed integrally with the diffusing member such that the diffusing surface of the diffusing member serves as the exit surface.

According to the present invention, a diffusing member capable of improving a diffusivity of light with suppressing a decrease in a light amount of the light incident on an illuminated region of an original can be provided.

[Image Reading Apparatus and Image Forming Apparatus]

Figure 16:
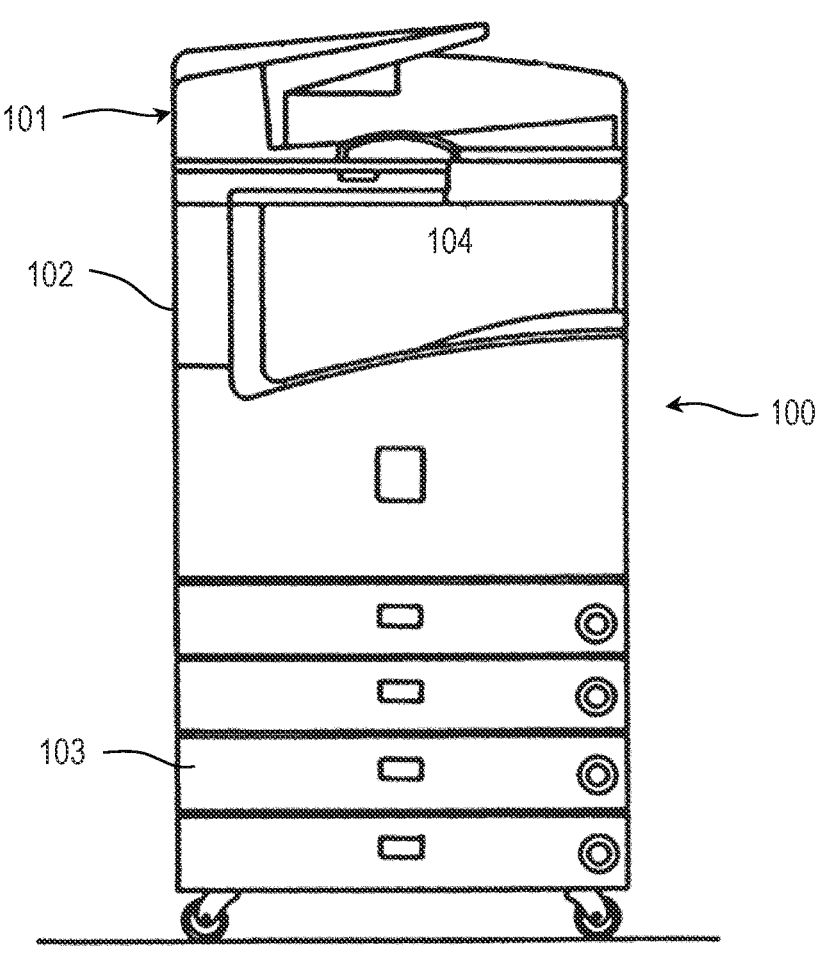
FIG. 16 is a front view of an image forming apparatus including the image reading apparatus according to the present invention.

FIG. 16 shows a front view of the image forming apparatus 100 including the image reading apparatus 101.

The image reading apparatus 101 includes the first image reading unit 314 or at least one of the first image reading unit 514 and the second image reading unit 315.

As shown in FIG. 16, the image forming apparatus 100 includes an image forming apparatus main body 102 (an image forming unit) for forming an image on a recorded sheet (a recorded material), and a sheet feeding cassette 103 arranged (attached) at a lower portion of the image forming apparatus main body 102 for stacking the recorded sheets.

Further, the image forming apparatus 100 includes the image reading apparatus 101 arranged on an upper portion of the image forming apparatus main body 102 for reading an image of an original.

Accordingly, the image forming apparatus main body 102 can form the image on the recorded sheet based on the image read by the image reading apparatus 101.

Inside the image forming apparatus main body 102, an image forming means (not shown) is arranged at a center portion, and a sheet feeding means (not shown) is arranged below the image forming means.

As the image forming means, a well-known electrophotographic print engine is provided, and a laser writing unit, an electrophotographic process unit with a photosensitive surface, a fixing unit and the like, which are not shown, are incorporated therein.

Further, as the sheet feeding means, a sheet feeding roller (not shown) for separating and feeding the recorded sheet placed on the sheet feeding cassette 103 and the like is incorporated therein, and the recorded sheet is fed to the image forming means.

Then, the image reading apparatus 101 including a CCD image sensor or the like as a reading unit for reading an image of an original is arranged above the image forming apparatus main body 102.

Further, a space is provided between the image reading apparatus 101 and the image forming apparatus main body 102, and a main body sheet discharging unit 104 for stacking a recorded sheet discharged after being conveyed by the image forming apparatus main body 102 is formed by the space.

Figure 17A:
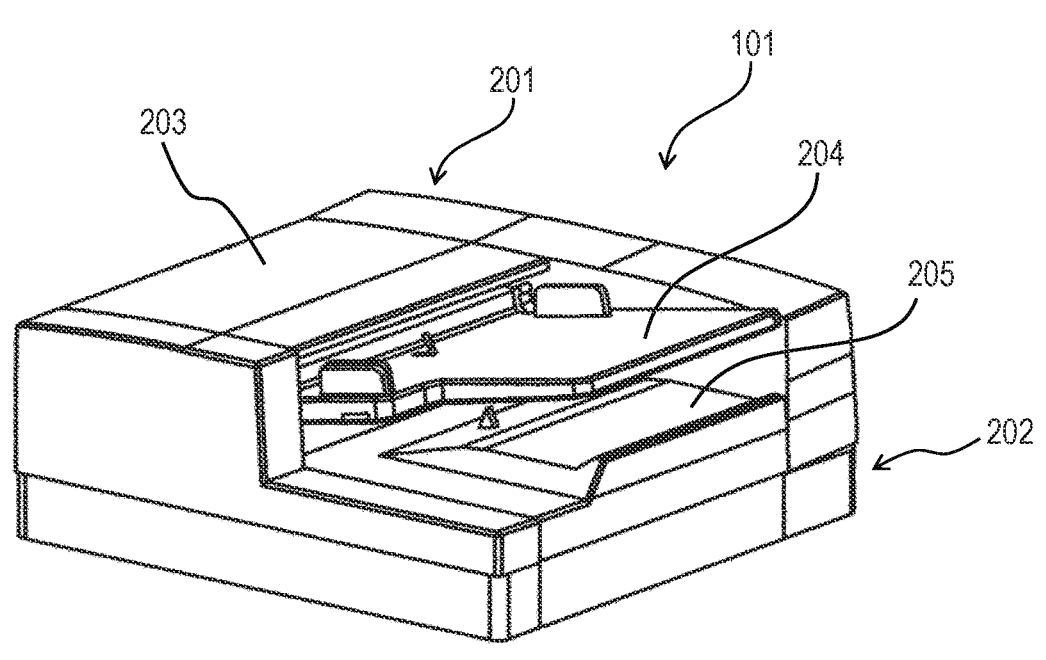
FIG. 17A is a perspective view of the image reading apparatus according to the present invention.
Figure 17B:
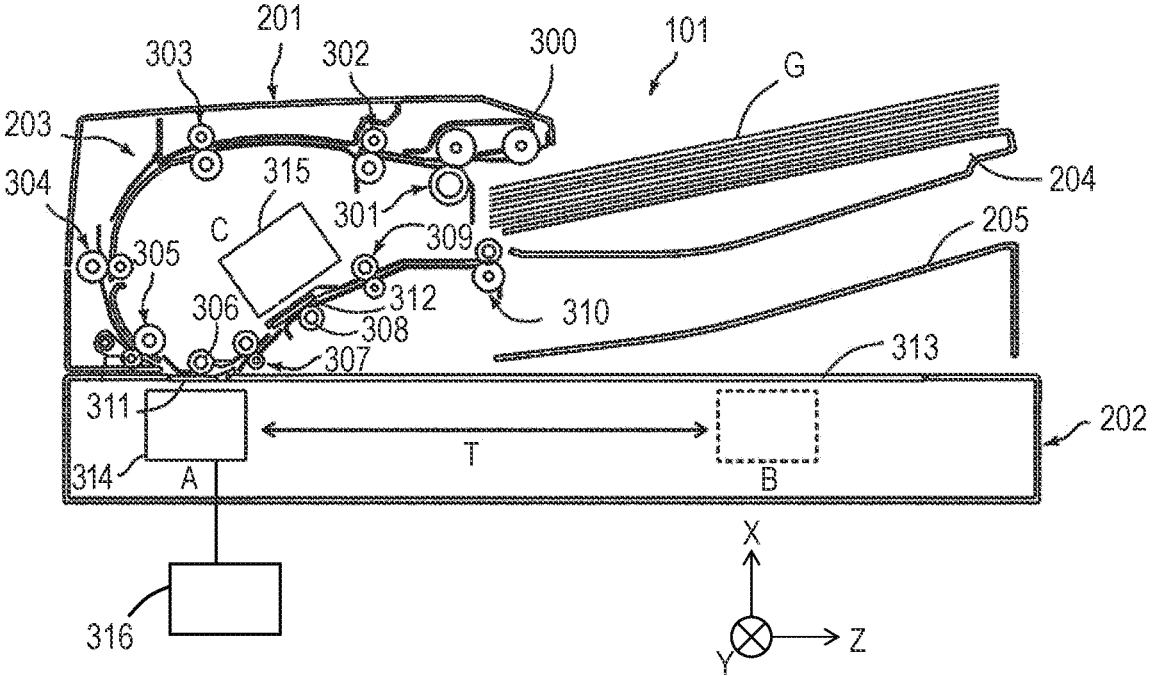
FIG. 17B is a cross-sectional view of the image reading apparatus according to the present invention.

FIG. 17A and FIG. 17B show a perspective view and a ZX cross-sectional view of the image reading apparatus 101, respectively.

As shown in FIG. 17A, the image reading apparatus 101 includes an automatic document feeder (hereinafter, referred to as ADF) 201 which is a conveying unit for conveying an original G.

Further, the image reading apparatus 101 includes a reader 202 provided below the ADF 201 for reading an image of one original surface (a front surface, a first surface) of the original G conveyed by the ADF 201.

The ADF 201 is configured to separate a plurality of originals G from each other and feed each original G to the reader 202.

Specifically, the ADF 201 includes an original tray 204 on which a plurality of originals G to be fed are placed, and an original conveying means 203 for conveying the plurality of originals G placed on the original tray 204 to the reader 202 such that the plurality of originals G are fed with being separated one by one.

Further, the ADF 201 includes a paper discharging tray 205 on which the original G discharged after an image is read by the reader 202 is placed.

More specifically, as shown in FIG. 17B, the ADF 201 is provided with a pickup roller 300 and a pair of separation rollers 301 for feeding a plurality of originals G placed on the original tray 204 with separating the plurality of originals G from each other as members forming the original conveying means 203.

Further, a plurality of pairs of rollers for conveying the original G fed by the pair of separation rollers 301 are provided in the ADF 201 as members forming the original conveying means 203.

Specifically, the plurality of pairs of rollers include a pair of pull-out rollers 302 provided downstream of the pickup roller 300 and the pair of separation rollers 301 for pulling out the original G conveyed from the pair of separation rollers 301.

The plurality of pairs of rollers include a pair of conveying rollers 303 provided downstream of the pair of pull-out rollers 302 for conveying the original G conveyed by the pair of pull-out rollers 302 to pairs of rollers at a downstream side.

The plurality of pairs of rollers include a pair of registration rollers 304 provided downstream of the pair of conveying rollers 303 for correcting an inclination of the original G.

The plurality of pairs of rollers include a pair of first read rollers 305, a first platen roller 306, a pair of second read rollers 307, a second platen roller 308 and a pair of third read rollers 309 each of which is provided downstream of the pair of registration rollers 304 for stably reading an image of the original G.

The plurality of pairs of rollers include a pair of discharging rollers 310 provided downstream of the pair of third read rollers 309 for discharging the original G after the image is read to the paper discharging tray 205.

As shown in FIG. 8, the first platen roller 306 is configured to convey the original G while biasing the original G onto the first platen glass 311 with providing a predetermined gap with respect to the first platen glass 311 (a first light transmitting member).

Further, as shown in FIG. 12, the second platen roller 308 is configured to convey the original G while biasing the original G onto the second platen glass 312 with providing a predetermined gap with respect to the second platen glass 312 (a second light transmitting member).

As shown in FIG. 17B, the first image reading unit 314 (a first image reading portion) is provided inside the reader 202 so as to be movable on a rail (not shown) in the Z direction.

Specifically, the first image reading unit 314 is configured to read the image of the front surface of the original G conveyed by the ADF 201 with stopping at a first position A below the first platen glass 311 provided on the facing side (below) of the first platen roller 306. Thereby, it is possible to perform the feeding-reading of the original G.

Further, the first image reading unit 314 can read an image of the original G placed on the original table glass 313 by moving for scanning in the Z direction from the first position A to a second position B by driving of a motor (not shown) controlled by a controller 316. Thereby, it is possible to perform the fixed reading of the original G.

In this way, the first image reading unit 314 can read the image of the front surface of the original G conveyed onto the first platen glass 311 by the ADF 201 and the image of the original G placed on the original table glass 313.

Then, the image data of the original G read by the first image reading unit 314 is processed by the controller 316.

Further, the second image reading unit 315 (a second image reading portion) for reading an image of the other original surface (a rear surface, a second surface opposite to the first surface) of the conveyed original G is provided inside the ADF 201.

Specifically, the second image reading unit 315 is provided at a position C facing the second platen roller 308 with the second platen glass 312 interposed therebetween.

By using the first image reading unit 314 and the second image reading unit 315 described above, it is possible to read images of both of the front surface and the rear surface of the original G conveyed by the ADF 201.

The first platen glass 311, the second platen glass 312 and the original table glass 313 are formed by a light transmitting material such as acrylic resin, polyester resin, polycarbonate resin or glass.

Note that the image forming apparatus 100 described above is one example, and the image reading apparatus 101 can also be applied to an image forming apparatus such as a facsimile apparatus, an inkjet printer or a copier.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-148815, filed Sep. 20, 2022, which is hereby incorporated by reference herein in its entirety.

What is claimed is:

1. An illuminating device comprising a diffusing surface with a plurality of protruding portions arrayed in a first direction, wherein the plurality of protruding portions includes a first group of protruding portions, tops of the first group of protruding portions being arranged on a first line parallel to the first direction when the first group of protruding portions are projected on a first cross section parallel to the first direction, and wherein the following conditions are satisfied:

$$1.5 \leq \beta/\alpha \leq 35$$

$$0 \leq \gamma/\beta \leq 0.5$$

where $\alpha$, $\beta$ and $\gamma$ represent frequencies of inclination angles of the first group of protruding portions within a range of $0° \pm 5°$, a range of $$\left[ \sin^{-1}\left(\frac{1}{n}\right) + \frac{1}{2}\sin^{-1}\left(\frac{\sin\omega}{n}\right) \right] \pm 5° \text{ and}$$

$$-\left[ \sin^{-1}\left(\frac{1}{n}\right) + \frac{1}{2}\sin^{-1}\left(\frac{\sin\omega}{n}\right) \right] \pm 5°,$$

and a range of $$\left[ \sin^{-1}\left(\frac{1}{n}\right) + \frac{1}{2}\sin^{-1}\left(\frac{\sin\omega}{n}\right) \right] \pm 5° \text{ and}$$

$$-\left[ \sin^{-1}\left(\frac{1}{n}\right) + \frac{1}{2}\sin^{-1}\left(\frac{\sin\omega}{n}\right) \right] \pm 5°,$$

respectively, at respective positions on a predetermined line n parallel to the first direction of the first group of protruding portions when the first group of protruding portions are projected on a second cross section including each top of the first group of protruding portions and perpendicular to the first cross section, $\omega$ represents a radiation angle of light incident on the diffusing surface, and n represents a refractive index of the illuminating device;

at least one light source;

a light guiding body formed of transparent optical material and having an incident surface and an exit surface, the light guiding body configured to guide light emitted from the at least one light source; and a diffusing member configured to diffuse the light guided by the light guiding body toward an irradiated surface, wherein the incident surface is a surface on which the light from the at least one light source is incident, and the exit surface is a surface from which the light from the incident surface exits toward the irradiated surface, and wherein the light guiding body and the diffusing member are integrated with each other such that the diffusing surface of the diffusing member serves as the exit surface of the light guiding body; and based on the diffusivity of the light exiting from the exit surface by a diffusing structure formed on the exit surface of the light guiding body and an availability efficiency of light in the light guiding body satisfying the conditions, the diffusivity of a light amount improves and the decrease in the light amount of the light exiting from the exit surface is suppressed.

2. The illuminating device according to claim 1, wherein the predetermined line is the first line.

3. The illuminating device according to claim 1, wherein an absolute value of the inclination angle when the plurality of protruding portions are projected on a third cross section perpendicular to the first direction at each position of the plurality of protruding portions is $$\left[ \sin^{-1}\left(\frac{1}{n}\right) + \frac{1}{2}\sin^{-1}\left(\frac{\sin\omega}{n}\right) \right]$$

or less.

4. The illuminating device according to claim 1, wherein the plurality of protruding portions are arrayed in a second direction perpendicular to the second cross section.

5. The illuminating device according to claim 4, wherein a width in a third cross section perpendicular to the first direction of the protruding portion is equal to an interval between the protruding portions adjacent to each other in the second direction.

6. The illuminating device according to claim 1, wherein a shape in the second cross section of the protruding portion is represented by a sixth-order polynomial function with respect to a position in the first direction.

7. The illuminating device according to claim 1, wherein a width in the second cross section of the protruding portion is equal to an interval between the protruding portions adjacent to each other in the first direction.

8. The illuminating device according to claim 1, wherein the following condition is satisfied:

$$T_Y/\lambda \geq 10$$

where $T_Y$ represents a width in the second cross section of the protruding portion, and $\lambda$ represents a wavelength of the light.

9. The illuminating device according to claim 1, wherein the following condition is satisfied:

$$H_0/T_Y \leq 1.0$$

where $T_Y$ and $H_0$ represent a width and a maximum height in the second cross section of the protruding portion, respectively.

10. The illuminating device according to claim 1, wherein the diffusing member is a member formed by acrylic resin or polycarbonate resin.

11. The illuminating device according to claim 1, wherein the at least one light source is arrayed in the first direction, and wherein each of the light guiding body and the diffusing member is long in the first direction.

12. The illuminating device according to claim 1, further comprising a holding substrate support, the holding substrate support being positioned such that a held surface perpendicular to a light emitting surface of each of the at least one light source.

13. An image reading apparatus comprising:
a first image reader, wherein the first image reader includes:
at least one illuminating device according to claim 1, wherein the at least one illuminating device illuminates a first reading position on a first surface of an original through a first light transmitting member;
a first image sensor, configured to receive light from the first reading position; and
a first imaging optical assembly configured to guide the light from the first reading position to the first light image sensor.

14. The image reading apparatus according to claim 13, wherein the at least one illuminating device includes first and second illuminating devices arranged on opposite sides with respect to a cross section including the first reading position and parallel to the second cross section.

15. The image reading apparatus according to claim 13, wherein the first image reader reads an image of the first surface of the original by moving in a second direction perpendicular to an optical axis of the first imaging optical assembly and the first direction.

16. The image reading apparatus according to claim 13, further comprising a conveyor configured to convey the original in a second direction perpendicular to an optical axis of the first imaging optical assembly and the first direction.

17. The image reading apparatus according to claim 16, further comprising a second image reader,
wherein the second image reader includes:
the illuminating device, wherein the illuminating device illuminates a second reading position on a second surface opposite to the first surface of the original through a second light transmitting member;
a second image sensor, configured to receive light from the second reading position; and
a second imaging optical assembly configured to guide the light from the second reading position to the second light image sensor.

18. An image forming apparatus comprising:
the image reading apparatus according to claim 13; and
an image forming apparatus configured to form an image on a recorded material based on the image read by the image reading apparatus.

* * * * *